United States Patent
Tanaka

[19]
[11] Patent Number: 6,120,121
[45] Date of Patent: Sep. 19, 2000

[54] RECORDING APPARATUS AND A METHOD OF FORMING DRIVING DATA

[75] Inventor: Hideki Tanaka, Yokohama, Japan

[73] Assignee: Canon Kabushiki Kaisha, Tokyo, Japan

[21] Appl. No.: 07/894,745

[22] Filed: Jun. 5, 1992

[30] Foreign Application Priority Data

Jun. 7, 1991 [JP] Japan ................................. 3-136608
May 29, 1992 [JP] Japan ................................. 4-139175

[51] Int. Cl.[7] .............................. B41J 29/38; B41J 2/205
[52] U.S. Cl. ................................................. 347/12; 347/15
[58] Field of Search ....................... 347/15, 12; 358/298

[56] References Cited

U.S. PATENT DOCUMENTS

| | | | |
|---|---|---|---|
| 4,196,452 | 4/1980 | Warren et al. | |
| 4,313,124 | 1/1982 | Hara | |
| 4,345,262 | 8/1982 | Shirato et al. | |
| 4,449,150 | 5/1984 | Kato | 358/456 |
| 4,459,600 | 7/1984 | Sato et al. | |
| 4,463,359 | 7/1984 | Ayata et al. | |
| 4,558,333 | 12/1985 | Sugitani et al. | |
| 4,723,129 | 2/1988 | Endo et al. | |
| 4,740,796 | 4/1988 | Endo et al. | |
| 4,801,950 | 1/1989 | Frehling | 358/302 X |
| 4,814,886 | 3/1989 | Kuge et al. | 358/298 X |
| 4,860,026 | 8/1989 | Matsumoto et al. | 358/298 X |
| 4,930,018 | 5/1990 | Chan et al. | 358/298 |
| 5,252,986 | 10/1993 | Takaoka et al. | 347/15 |
| 5,483,358 | 1/1996 | Sugiura et al. | 358/508 |

FOREIGN PATENT DOCUMENTS

| | | |
|---|---|---|
| 0264302 | 4/1988 | European Pat. Off. |
| 0292292 | 11/1988 | European Pat. Off. |
| 0295105 | 12/1988 | European Pat. Off. |
| 0372826 | 6/1990 | European Pat. Off. |
| 54-056847 | 5/1979 | Japan |
| 59-123670 | 7/1984 | Japan |
| 59-138461 | 8/1984 | Japan |
| 60-071260 | 4/1985 | Japan |
| WO89/06080 | 6/1989 | WIPO |
| WO90/09075 | 8/1990 | WIPO |

*Primary Examiner*—N. Le
*Assistant Examiner*—Thinh Nguyen
*Attorney, Agent, or Firm*—Fitzpatrick, Cella, Harper & Scinto

[57] ABSTRACT

In a recording apparatus, two-level halftoning processing of input image data is performed in such a manner that the input image data is compared by a comparator with a threshold value stored in a threshold memory, and the results of the comparison are stored as driving data in nozzle memories corresponding to recording elements. This two-level halftoning processing is performed (n−1) times, thereby n-level halftoning processing of the input image data is performed.

37 Claims, 23 Drawing Sheets

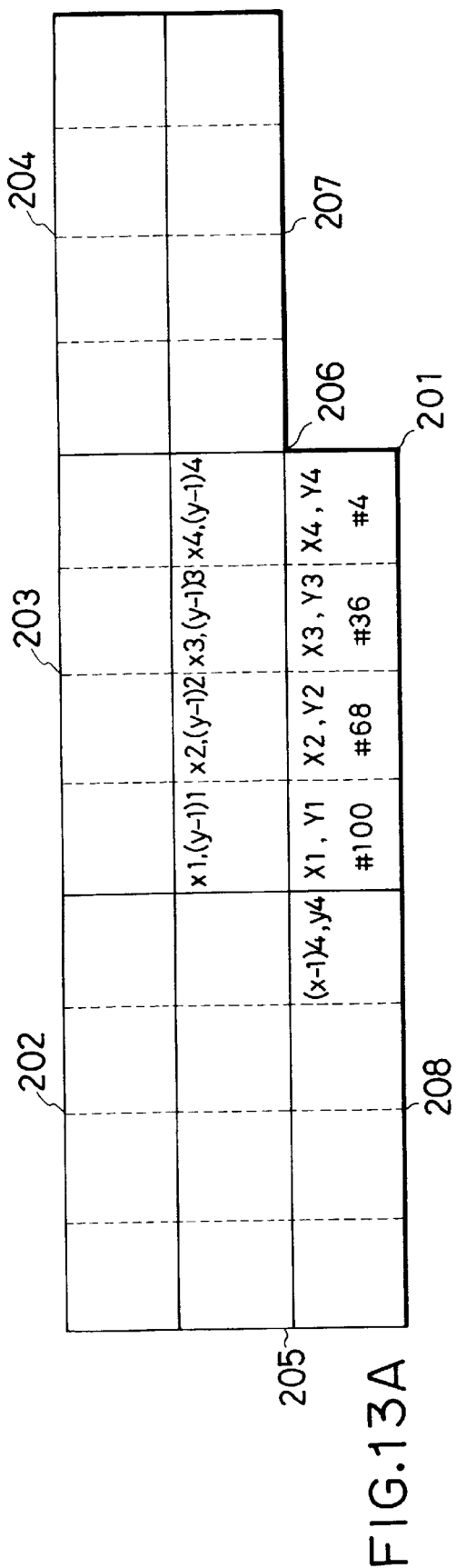
FIG.13A
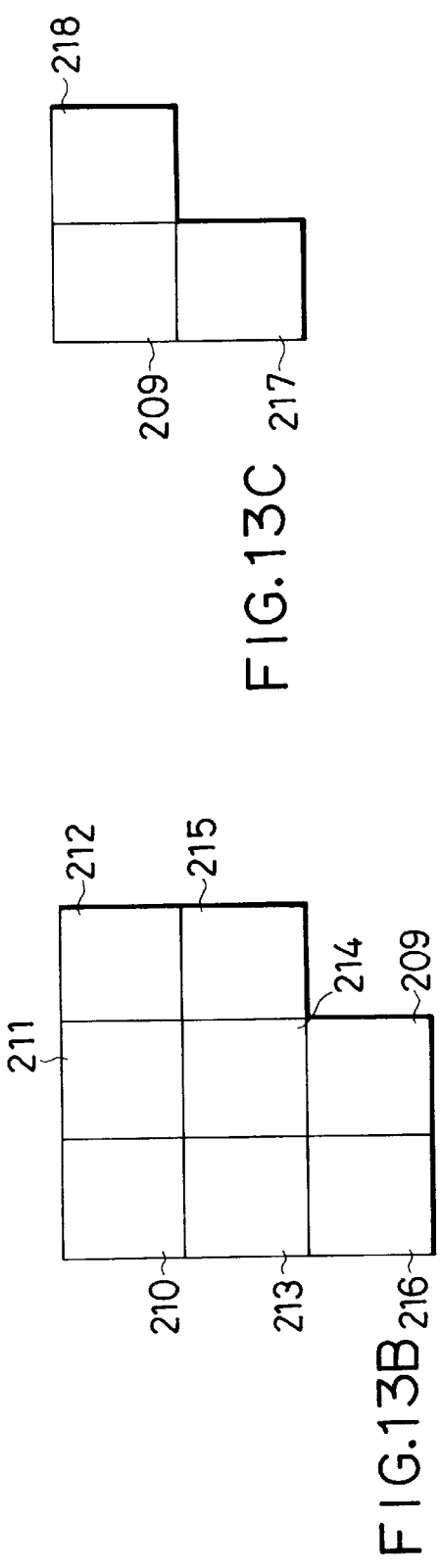
FIG.13B
FIG.13C

RECORDING APPARATUS AND A METHOD OF FORMING DRIVING DATA

BACKGROUND OF THE INVENTION

1. Field of the Invention

The present invention relates to a recording apparatus and a method of forming driving data for recording elements used in recording thereof, which are used in word processors, copy machines, facsimiles and so on, and used in a printer connected to a host computer for outputting information from host computer, and more particularly to a recording apparatus and a method of forming driving data used therefor using a serial type of recording head.

2. Description of the Prior Art

Characters and visualized images recorded on recording media such as recording sheets are digitized images generally formed by a set of pixels, each of which has individual density level (gray level) data. Each pixel is composed of a dot formed on the recording media by the recording head. As for recording heads for forming dots, a thermal transfer method and an ink jet recording method are widely known. Among them, an ink jet recording method has been widely used in recent years and it has many advantages in enabling relatively high fine-pitched dot formation and high speed recording.

In expressing gray scale of recorded images with several density levels, a dot density is assigned to each pixel according to these density level data, and the dot pattern for each pixel is determined in accordance with the dot density. Definition forms of the dot patterns are categorized into two groups, one refers to a method that a plurality of dots are placed in an identical position in responsive to the dot density, and the other refers to a method that a designated dot pattern is developed with a plurality of dots in response to the dot density.

Even though the dot pattern of each pixel has any patterns, it is necessary to determine driving data for driving recording elements of the recording head so as to form those dot patterns. In general, the driving data can be obtained as described hereinafter.

For example, performed are various processing such as γ (Gamma)—correction, color correction, or undercolor eliminating processing as well as a multi-level halftoning (gray scale) processing (pseudo-halftoning process) corresponding to the number of dots which form each pixel. For this processing, such as an error diffusion method, a dither method, etc. are known in the art.

Referring to FIGS. 1 and 2, an example of conventional multi-level halftoning processing using the error diffusion method will be explained.

In FIG. 1, reference numeral 1001 denotes a specified pixel in which the multi-level halftoning processing is to be performed, and it has data I(x,y). Where I(x,y) is the product of original 8-bit density level data (representing levels between 0 to 255) of the specified pixel (x,y) and an error produced by the multi-level halftoning processing in the pixel in which the multi-level halftoning processing has been already performed. Numerals 1002 to 1008 denote pixels in which the multi-level halftoning processings have already been performed, and these pixels are surrounding pixels of the specified pixel. Each of constants a to g inside these pixels represents a multi-level value which is obtained by performing the multi-level halftoning processing. For example, in the case that a five-level halftoning processing is carried out, the five-level values a to g are integers among 0 to 4. FIG. 2 represents constants A to G for weighting the respective pixels in each of which the five-level halftoning processing has been performed. These constants are used to determine a threshold level for the five-level halftoning processing.

Firstly, mean density of the surrounding pixels is calculated by using the five-level data a to g of the pixels 1002 to 1008 which are the surrounding pixels of the specified pixel and in each of which the five-level halftoning possessing has already been performed, and weighted data A to G. More concretely, the mean density MV can be calculated by the following equation.

$$MV = a*A + b*B + c*C + d*D + e*E + f*F + g*G$$

Next, a threshold value for the five-level halftoning processing of the specified pixel is obtained by means of adding the mean density MV to each of predetermined threshold data stored in a memory, and then, this threshold value is compared with the density level data I (x,y) so that multiple-valued data P of the specified pixel is obtained as follows.

If $MV+T > I(x,y)$ then P=0.
If $MV+T \leq I(x,y) < S1+MV+T$, then P=1.
If $S1+MV+T \leq I(x,y) < S2+MV+T$, then P=2.
If $S2+MV+T \leq I(x,y) < S3+MV+T$, then P=3.
If $S3+MV+T \leq I(x,y)$, then P=4.
[Where $T=(S3-S2)/2=(S2-S1)/2$]

Next, an error produced when the five-level halftoning processing of the density level data I(x,y) is performed, can be given as, $$ERROR = p*S1 + MV + T - I(x,y)$$

The ERROR is distributed at a certain predetermined rate to several pixels which are the surrounding pixels and in each of which the five-level halftoning processing has not yet been performed.

The five-level value of each pixel can be obtained by carrying out in order the processing described hereinabove on each pixel, wherein the five-level value corresponds to the number of dots of each pixel as mentioned above.

Known in the art are many kinds of methods of forming the plurality of dots which construct each pixel, on a recording media. For example, in an ink jet system, a multiple-droplet system is well known in the art, in which a single dot is formed in appearance by causing a plurality of ink-droplets to be projected substantially on an identical position of the recording media. Also known in the art is a recording method for separating one pixel into a plurality of segments and forming dots on each segment in correspondence with the density level data of the pixel.

However, both of them are constructed such that a plurality of dots of one pixel are formed by a single recording element. For example, in an ink jet system, the plurality of dots are formed by each of ink-droplets ejected from one ink orifice (ink jet nozzle). In such a system, when the ejected ink-droplets measure varies, the densities of pixels become different from each other. Thus, the deterioration in quality of picture arises in the case of multitude of different shades (lighter and darker variations) appeared in a recorded image. To solve such a problem, an improved system was proposed by the assignee of the present invention. In the improved system, one pixel is composed of a plurality of dots and each of these dots are formed by the respective different recording element. In case that the improved system and the conventional pseudo-halftoning processing are combined with each other, it is further necessary to assign each of recording elements to the multi-level value data of each pixel obtained by the pseudo-halftoning processing.

SUMMARY OF THE INVENTION

The inventors of the present invention directed their attention to the fact that the data which are assigned to recording elements and are called the driving data are binary data having value "0" or "1", and thought out that the processing for generating the driving data and assigning them to the recording elements was performed simultaneously with the comparing processing with the threshold level in the pseudo-halftoning processing.

An object of the present invention is, therefore, to provide a more improved method of forming driving data. In the method the number of processing steps in the pseudo-halftoning processing and that in a processing for assigning driving data to each recording element on the basis of the pseudo-halftoning processing can be decreased, as a result, the loads on hardware and/or software can be reduced.

In the first aspect of the present invention, a recording apparatus for recording an image with a set of pixels composed of a dot formed on a recording medium, comprises:

a recording head having a plurality of recording elements;

a driving means for driving the plurality of recording elements of the recording head in accordance with driving data so as to form the dots; and an n-level halftoning processing means (n−1=the number of the driving data for forming the dots composing the pixel) for converting an input image data into the driving data of each of the pixels in such a manner that a two-level halftoning processing of the input image data is performed (n−1) times, and each result of the (n−1) times two-level halftoning processings is assigned as the driving data to one of the plurality of recording elements by each of the (n−1) times two-level halftoning processings.

Here, the two-level halftoning processing may be performed corresponding with each of (n−1) recording elements used for forming the dots composing the pixels.

The two-level halftoning processing may be performed in correspondence with each of (n−1) dots composing the pixels.

The two-level halftoning processing may be performed in correspondence with each of pseudo-pixels made by dividing the pixel into (n−1) pixels.

An error produced by the two-level halftoning processing may be distributed to other pseudo-pixels.

The pixel may be composed of the plurality of dots, and each of the plurality of dots may be formed by different recording elements during respective scanning of the recording head.

The recording element of the recording head may include an orifice for ejecting ink, and means for generating heat energy utilized for ejection of ink from the orifice, whereby a bubble is generated by the heat energy, the ink is ejected from the orifice according to the generation of the bubble, and the dots are formed by the ejected ink.

The recording elements to which the result of the two-level halftoning processing is assigned may be sequentially selected.

The recording elements to which the result of the two-level halftoning processing is assigned may be selected at random.

The recording elements to which the result of the two-level halftoning processing is assigned may be selected according to a position of the pixel on the image.

The pixel may be composed of the plurality of dots, and each of the plurality of dots may be formed by different recording elements during respective scanning of the recording head.

The recording elements of the recording head may include an orifice for ejecting ink, and means for generating heat energy utilized for ejection of ink from the orifice, whereby a bubble is generated by the heat energy, the ink is ejected from the orifice according to the generation of the bubble, and the dots are formed by the ejected ink.

The recording elements to which the result of the two-level halftoning processing is assigned may be sequentially selected.

The recording elements to which the result of the two-level halftoning processing is assigned may be selected at random.

The recording elements to which the result of the two-level halftoning processing is assigned may be selected according to a position of the pixel on the image.

In the second aspect of the present invention, a method of forming driving data for a recording apparatus which uses a recording head having a plurality of recording elements and in which the recording elements are driven according to the driving data to form dots to a recording medium so that an image is recorded with a set of pixels composed of the dots, the method comprises the steps of:

performing a two-level halftoning processing of an input image data, a result of the two-level halftoning processing being assigned as the driving data to one of the plurality of recording elements by the two-level halftoning processing; and repeating the two-level halftoning processing (n−1) times (n−1=the number of the driving data for forming the dots composing the pixel) so that n-level halftoning processing is performed and the input image data is converted into the driving data of each of the pixels.

Here, the two-level halftoning processing may be performed corresponding with each of (n−1) recording elements used for forming the dots composing the pixels.

The two-level halftoning processing may be performed in correspondence with each of (n−1) dots composing the pixels.

The two-level halftoning processing may be performed in correspondence with each of pseudo-pixels made by dividing the pixel into (n−1) pixels.

An error produced by the two-level halftoning processing may be distributed to other pseudo-pixels.

The pixel may be composed of the plurality of dots, and each of the plurality of dots may be formed by different recording elements during respective scanning of the recording head.

The recording element of the recording head may include an orifice for ejecting ink, and means for generating heat energy utilized for ejection of ink from the orifice, whereby a bubble is generated by the heat energy, the ink is ejected from the orifice according to the generation of the bubble, and the dots are formed by the ejected ink.

The recording elements to which the result of the two-level halftoning processing is assigned may be sequentially selected.

The recording elements to which the result of the two-level halftoning processing is assigned may be selected at random.

The recording elements to which the result of the two-level halftoning processing is assigned may be selected according to a position of the pixel.

The pixel may be composed of the plurality of dots, and each of the plurality of dots may be formed by different recording elements during respective scanning of the recording head.

The recording element of the recording head may include an orifice for ejecting ink, and means for generating heat energy utilized for ejection of ink from the orifice, whereby a bubble is generated by the heat energy, the ink is ejected from the orifice according to the generation of the bubble, and the dots are formed by the ejected ink.

The recording elements to which the result of the two-level halftoning processing is assigned may be sequentially selected.

The recording elements to which the result of the two-level halftoning processing is assigned may be selected at random.

The recording elements to which the result of the two-level halftoning processing is assigned may be selected according to a position of the pixel on the image.

BRIEF DESCRIPTION OF THE DRAWINGS

FIGS. 13A, 13B and 13C are schematic illustrations illustrating a pseudo-halftoning processing in the two-level (bi-level) halftoning processing of embodiment 2;

DETAILED DESCRIPTION OF PREFERRED EMBODIMENTS

These and other features of the present invention and one embodiment of it are more fully described below in the detailed description and with the accompanying drawings.

Figure 1:
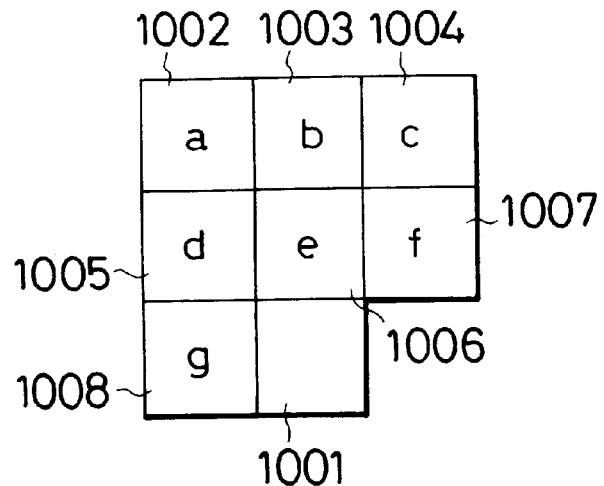
FIG. 1 shows a schematic illustration for illustrating a pseudo-halftoning processing of error diffusion in the conventional five-level halftoning processing.
Figure 2:
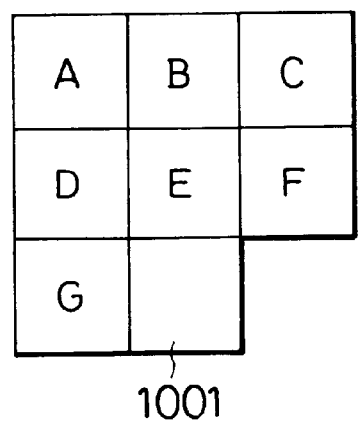
FIG. 2 is a schematic illustration of a weighting mask for use in the conventional pseudo-halftoning processing of error diffusion.
Figure 3:
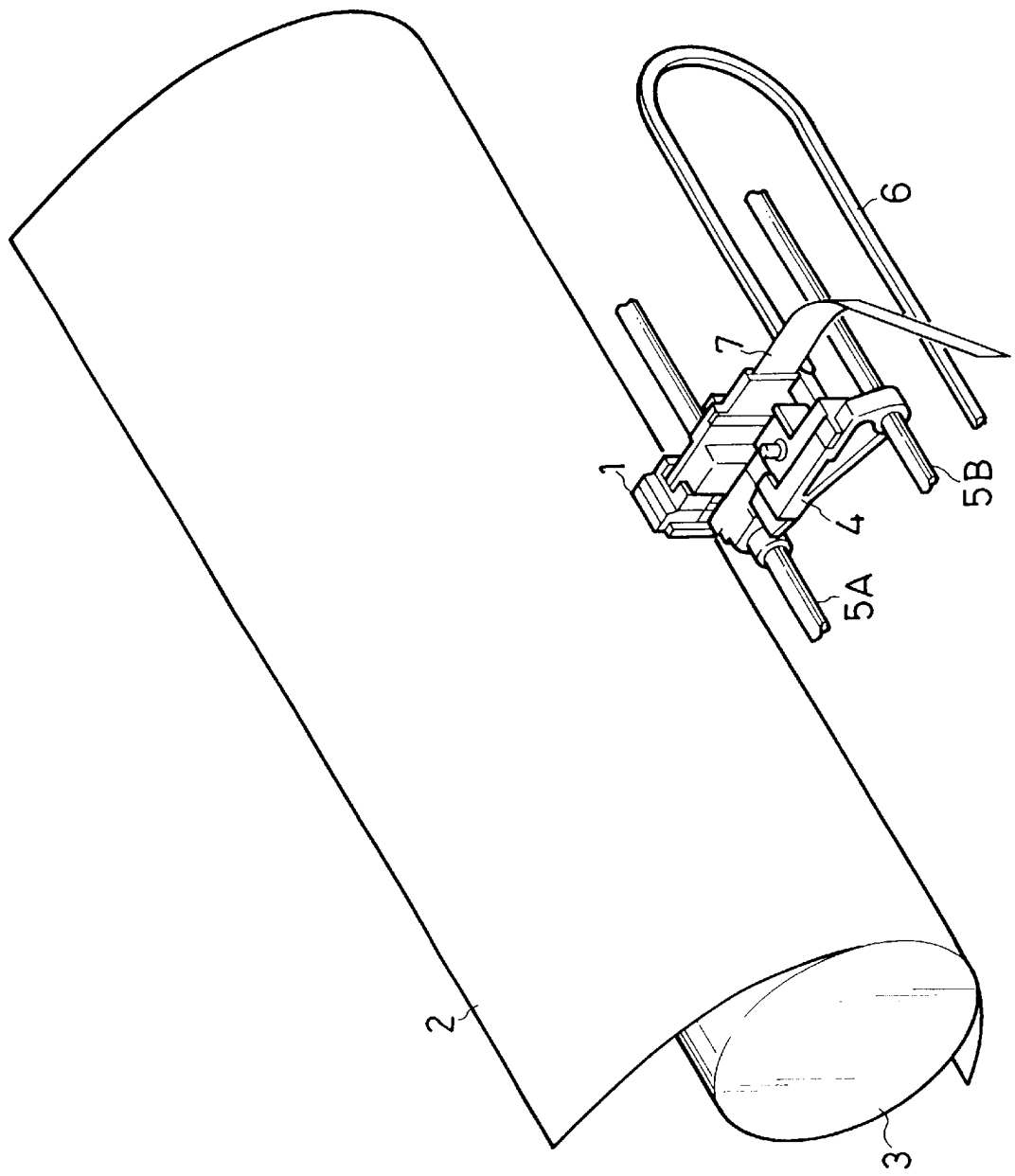
FIG. 3 shows a schematic perspective view of an ink jet recording apparatus applicable for each embodiment of the present invention.

FIG. 3 is a perspective view showing major parts of an ink jet recording apparatus of one embodiment of the present invention. In FIG. 3, in the recording head 1, for example, 32 orifices with their mutual interval being 63.5 $\mu$m (400 dots per inch) are placed in an array extended in the direction in which the recording paper 2 is fed, this direction designated sub-scanning direction, and in each ink path connecting to each corresponding orifice, installed is a heater for generating thermal energy used for ejecting ink droplets. The heater generates thermal energy in response to electric pulses correlated with driving signal data, and film boiling occurs in the ink fluids which leads to generating a bubble and finally to ejection of an ink droplet from the orifice. In this embodiment, the frequency of heater driving signals, that is, the ejection frequency, is 2 kHz. Incidentally, in embodiments described here and hereinafter of the present invention, term "discharging portion", "outlet" or "nozzle" may be used instead of term "orifice".

A carriage 4 on which a recording head 1 is mounted is supported by a couple of guide shafts 5A and 5B so as to move freely along the guide shafts 5A and 5B. In the following description, this movement of the recording head 1 is called main-scanning and its scanning direction is called main-scanning direction. The carriage 4 is fixed on a part of a belt expanded by pulleys and the carriage 4 is moved by rotational movements of pulleys driven by the motor linked with the pulleys. In FIG. 3, these pulleys and the motor are not shown. An ink tube 6 is connected to the recording head 1, through which the ink fluids can be supplied from an ink tank not shown to the recording head 1. A flexible cable 7 is connected to the recording head 1 which can transmit driving signals corresponding to recording data and control signals from a host apparatus or a control part of the ink jet recording apparatus to a head driving circuit (a head driver). The ink supply tube 6 and the flexible cable 7 are composed of flexible materials so as to follow the movement of the carriage 4.

The longer side of the platen roller 3 is extended in parallel to the guide shafts 5A and 5B and the platen roller 3 is driven by a paper feed motor not shown and used for feeding a recording sheet 2 as recording media and for defining a recording face of the recording sheet 2. In the above described structure, the recording head 1 ejects the ink fluids on the recording face of the recording sheet 2 in front of the orifices of the recording head 1.

Figure 4:
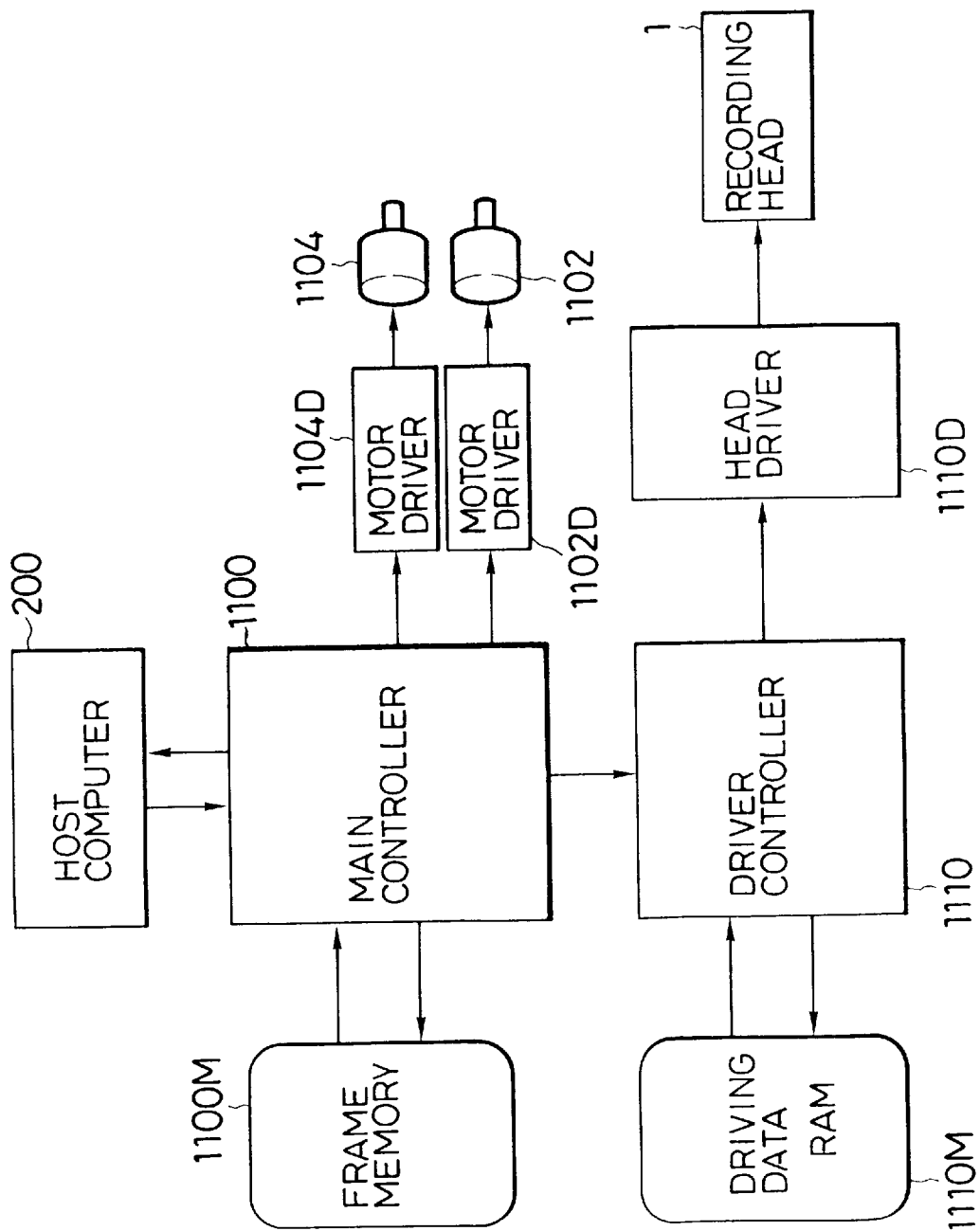
FIG. 4 is a block diagram of a control structure of the ink jet recording apparatus shown in FIG. 3.

FIG. 4 is a block diagram showing a control structure of the ink jet recording apparatus as shown in FIG. 3.

A main controller 1100 is composed of CPU on, and transfers image data supplied from a host computer 200 into density level data of each pixel and stores the density level data into the frame memory 1100M. The main controller 1100 supplies the density level data of each pixel stored in the frame memory 1100M to the driver controller 1110 in predetermined timing. As described later with FIG. 15 and so on, the driver controller 1110 converts the density level data supplied from the frame memory 1100M into drive data which describes turn-on or turn-off signals to each heater of the recording head 1 and each of which corresponds to a respective orifice index number and respective scan number. The orifice index number is the order of the orifice array in the recording head and the scan number is the sequential number of iterative main-scanning operations. The drive data converted by the driver controller 1110 are stored in the drive data RAM 1110M. The driver controller 1110 read out the drive data stored in the drive data RAM 1110M by referring their orifice index number and scan number in responsive to control signals from the main controller 1100, and supplies the read-out drive data into the head driver 1110D and controls its driving timing.

In the above described structure, the main controller 1100 controls the ink ejection by the recording head 1 and the rotational movements of the carriage drive motor 1104 and the paper feed motor 1102 through the driver controller 1110, the motor driver 1104D and the motor driver 1102D. So far, characters and graphic images corresponding to input image data are recorded on the recording sheet 2.

In the above described structure, though the driver controller 1110 converts the density level data into the drive data, this conversion may be performed by the main controller 1100. In this case, the drive data can be stored in the frame memory 1100M and hence, the RAM 1110M can be removed.

Figure 5:
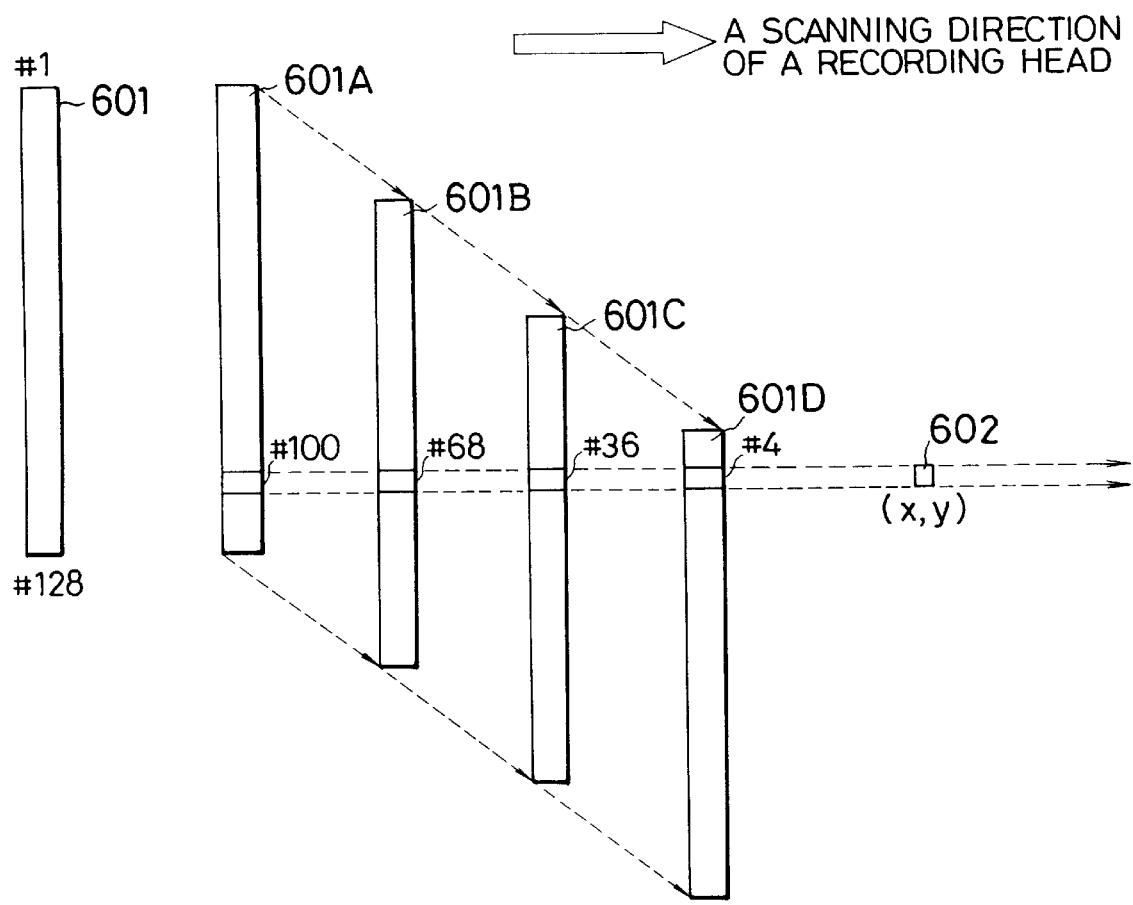
FIG. 5 is a schematic illustration for illustrating a recording method used in each embodiment of the present invention.

Referring now to FIG. 5, a is described for forming a plurality of dots of one pixel by means of different recording elements, which is the basic structure of each embodiment described hereinafter. FIG. 5 is a schematic illustration of forming one pixel by using ink droplets ejected from a plurality of ink orifices. In FIG. 5, the recording head 601 has a plurality of orifices, for example, 128 orifices. The recording head 601 is moved from left to right in FIG. 5. The dots of each pixel are formed by the ink droplets ejected from each orifice in accordance with the assigned driving data. A reference numeral 601A denotes the position of initial scanning of the recording head 601 with respect to a recording medium, and numerals 601B, 601C, 601D each denotes a subsequent position of scanning in order. A numeral 602 denotes one pixel recorded by the above scanning. The numbers prefixed by a symbol # denote orifice numbers of each orifice in the recording head 601.

In the structure described above, assuming that only the pixel 602 is specified, a plurality of dots of the pixel 602 are formed by ejection or non-ejection from the orifices #100, #68, #36 and #4 during each of four times scanning 601A, 601B, 601C and 601D of the recording head 601. When the ink is ejected from all the orifices, the density level is maximum, and when not ejected from all orifices, it is minimum. The medium density level between the maximum level and the minimum level is, of course, formed by the combination of absence or presence of ejection from each orifice.

Embodiment 1

Figure 6:
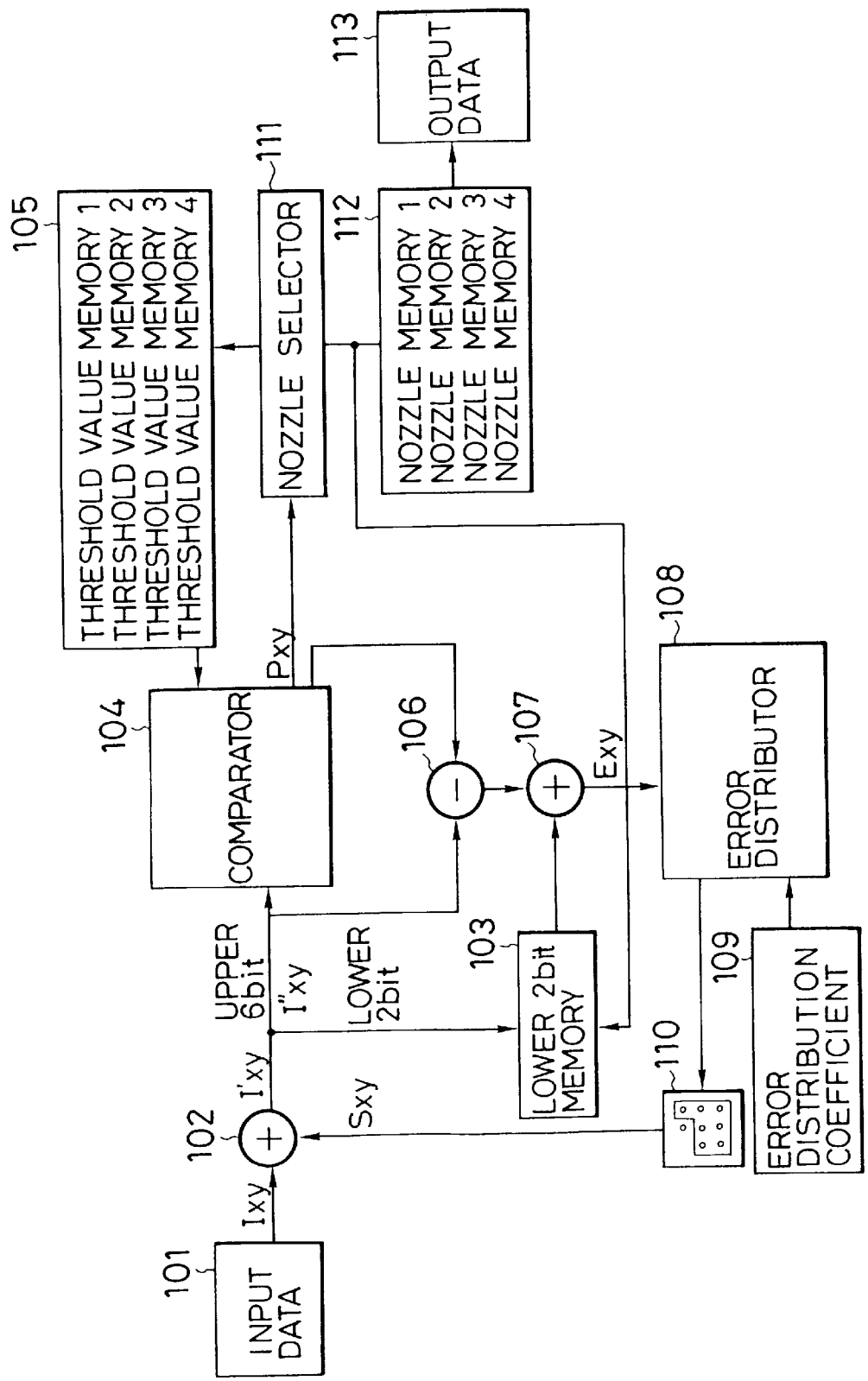
FIG. 6 is a block diagram of the structure of a image signal processing and a driving data assigning processing in embodiment 1 of the present invention.

FIG. 6 is a block diagram showing a structure of image signal processing composed in the control structure shown in FIG. 4. In the figure, for the clarity of explanation, a simplified signal processor is shown, in which the density level with five levels of one pixel is expressed by ink droplets ejected from four different orifices (also called nozzles hereinafter).

In FIG. 6, input data 101 are 8-bit data representing density levels between 0 and 255 and are assigned in correspondence with each of pixels. The input data of a specified pixel (x,y) are inputted as input data Ixy, to which an error data Sxy are added by an adder 102 in order to obtain data I'xy. The lower 2 bits of data I'xy are stored in a lower 2-bit memory 103, and the upper 6 bits thereof, as data I"xy, are transmitted to a comparator 104. That is, a density level value of the data I"xy is one-fourth of the density level value of the data I'xy to which the error data Sxy are added. A comparator 104 compares in magnitude the data I"xy with one of threshold data in a threshold memory unit 105. If the data I"xy is equal to or larger than the threshold data in the threshold memory unit, "1" is, as data Pxy, output and if not, "0" is outputted. In addition, the threshold data are transferred to a subtractor 106 to obtain the difference between the threshold value and the data I"xy. An adder 107 adds the data from this subtractor 106 to the lower 2-bit data of the data I'xy to which the error has already been added. The sum is, as output from the adder 107, transferred to an error distributor 108 to distribute around a noted pixel according to an error diffusion matrix determined by an error distribution coefficient 109. In other words, the output Exy is stored according to the error diffusion matrix, in a memory for accumulating the errors distributed around the specified pixel. The output Sxy of a distributed error accumulating memory 110 is added to the data Ixy of the noted pixel to be processed, by the adder 102. A nozzle memory unit 112 has a line memory of 1 bit, and stores the driving data of each orifice, namely "0" or "1". A numeral 113 denotes an output data including the driving data of a line which is now recording.

In the structure described above, the data (values) of each threshold memory in the threshold memory unit 105 is presets as follows.

| | |
|---|---|
| Threshold memory 1 | threshold value 8 |
| Threshold memory 2 | threshold value 24 |
| Threshold memory 3 | threshold value 40 |
| Threshold memory 4 | threshold value 56 |

Figure 7:
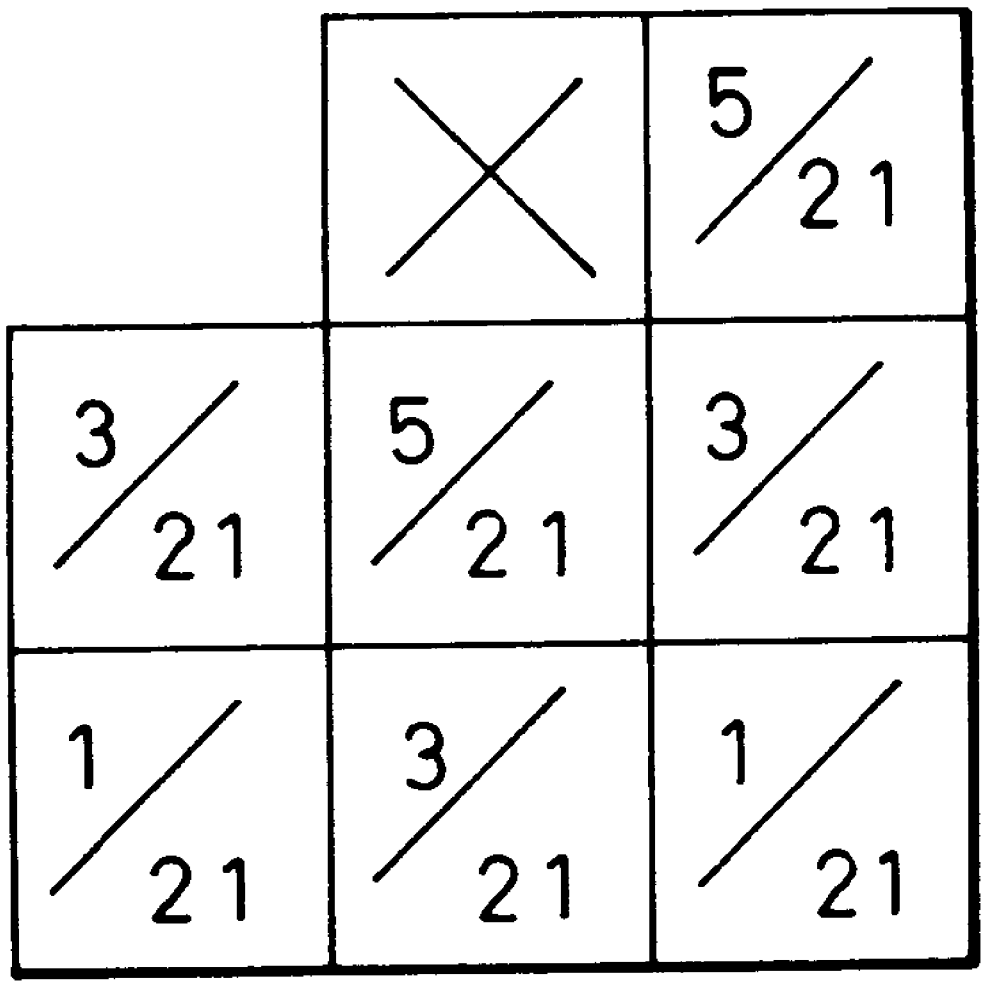
FIG. 7 is a schematic illustration of a diffusion matrix used in an error diffusion method in embodiment 1 of the present invention.

The distribution ratio of the error diffusion coefficient 109 is as that of FIG. 7. The nozzle memory unit 112 is set to zero every one scanning. The above structure is that of the error diffusion of multi-fixed threshold values. The structure will be described in detail hereinafter.

In order to obtain the data I'xy, added to the data Ixy of the specified pixel is the error Sxy which has already distributed by the multi-level (in this case, five-level) halftoning processing of other pixel which has processed before the specified pixel is to be processed. The data I'xy divided into the upper 6 bits and the lower 2 bits stored in the lower 2-bit memory. That is, it means that the data I'xy are reduced to one-fourth level, and the remainder is stored in the memory 103. The multi-level halftoning processing of the image signal is essentially performed to the data I"xy of the upper 6 bits.

The data I"xy are compared with the value of the threshold memory 1, namely the threshold value 8, in the comparator 104. At this time, selected is a threshold memory with the same number as that of the nozzle memory selected by the nozzle selector. Next, as a result of comparison, if the data I'xy is equal to or larger than the threshold value of the threshold memory 1, then "1" is outputted to the nozzle selector 111 as the output Pxy, if it is smaller than that, then "0" is outputted. The nozzle selector 111 allows the output Pxy to store in the nozzle memory 1. At the same time, the comparator 104 sends the threshold value at the time to the subtractor 106, in which difference between the threshold value and data I"xy is calculated. The output (difference value) of the subtractor 106 is transferred to the adder 107. Next, the nozzle selector 111 selects the nozzle memory 2 and the threshold memory 2. The comparator 104 compares in a manner similar to that described above, and sends the threshold value to the subtractor 106, in which the processing similar to that described above is performed. The output of the subtractor 106 is added to the last output of the subtractor 106. Similarly, the nozzle selector 111 selects in order the nozzle memory 3, 4 and the threshold memory 3, 4 and performs the procedure similar to that described above. However, when the value of the output Pxy turns to "0", selecting operation of the nozzle selector 111 would be stopped.

In other words, either when the nozzle selector 111 is counted up to 4, or when the output Pxy turns to "0", the data accumulated in the subtractor 106 and the data of lower 2 bit of the input data I'xy stored in lower 2 bit memory 103, are finally added in the adder 107. The sum is transferred as error data Exy to the error distributor 108.

As described above, according to embodiment 1 of the present invention, the procedure comparing with the threshold value in the multi-level halftoning processing (pseudo-halftoning processing) directly corresponds to the procedure for producing the driving data ("0" or "1") and to the assignment of the driving data to each orifice. Thus, the number of steps from the image data processing to the driving data producing is decreased, and the load on hardware and/or software is also reduced.

Figure 8:
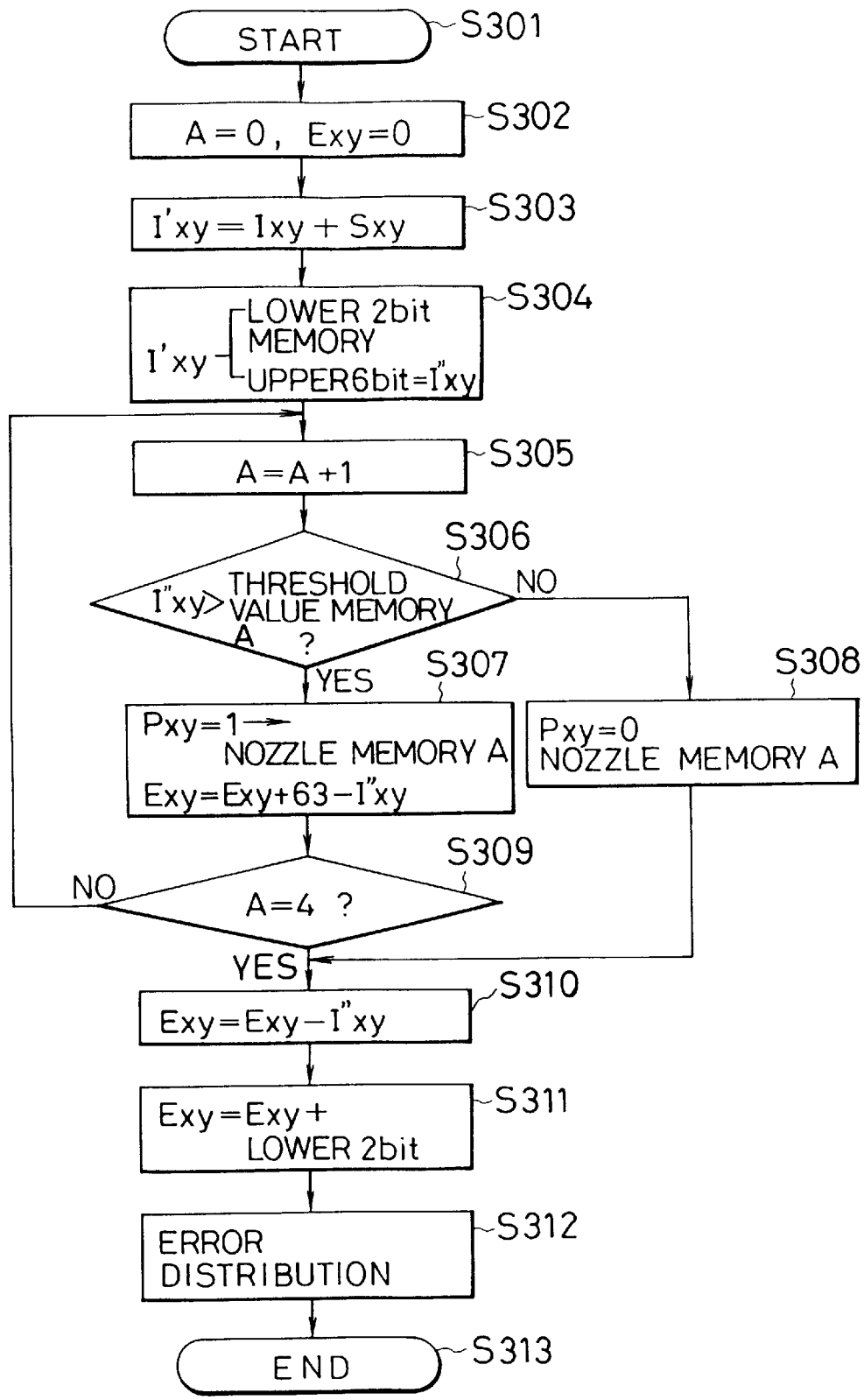
FIG. 8 is a flow chart illustrating the procedure of embodiment 1 mentioned above.

FIG. 8 is a flow chart illustrating in detail the procedure of the error diffusion processing and the driving data formation, which are described above, and FIG. 9 is a graph showing the relationship at this time between the input data I'xy, and the number of ejected liquid droplets and the corresponding orifice number. It is assumed that the specified pixel is formed by the orifices of #4, #36, #68 and #100 shown in FIG. 5. Further assumed are that the density level of the input data of the specified pixel (x,y) is Ixy=195, and the error which has already diffused around this pixel is Sxy=2, that various processing such as the input γ—correction, the color-correction, the black production, the output γ—correction, etc. in the image recording apparatus have already completed, and that the nozzle memories 1 to 4 corresponding to the specified pixel (x,y) each is set to zero.

In FIG. 8, before starting the processing of the specified pixel, a counter A for counting up the nozzle selector 111 is set to zero, and the accumulated error Exy is also set to zero at step S302. At step S303, the error data Sxy are added to the specified pixel data Ixy by the adder 102 to yield the data I'xy. At next step S304, the lower 2 bits of the data I'xy are stored in the lower 2 bit memory 103, and the upper 6 bits thereof are set as the data I"xy. At step S305, the value 1 is added to the counter A. At step S306, the value of I"xy is compared with the threshold value stored in the threshold memory 1, the numeral of which corresponds to the value of the counter A, i.e. the value 1, by means of the comparator 104. If the value of data I"xy is equal to or larger than that of the threshold memory 1, then it goes to step S307, and if the value of data I"xy is smaller than that of the threshold memory 1, then it goes to step S308. When the value of the data I"xy is equal to or larger than that of the threshold memory 1, at step S307, "1" is outputted as the output Pxy to the nozzle selector 111, which causes the output value to store in the nozzle memory 1. At the same time, the calculation of Exy=Exy+63-I"xy is carried out, using the subtractor 106 and the adder 107. Next, at step S309, whether or not the value of A equal to 4 is checked. When its value is 4, it goes to step S310. In this event, since A=1, it returns to the step S305, and the processing following the step S305 are repeated. On the other hand, when the value of data I"xy is smaller than the threshold value of the threshold memory designated by the counter A, at step S308, "0" is outputted as the output Pxy to the nozzle selector 111, which stores in the nozzle memory designated by the counter A, and then it goes to the step S310.

In summary, the value of the data I"xy is compared in order with each of four threshold values four times, or these steps, that is, binarizations are repeated until the value of the data I"xy becomes smaller than the threshold value. Either ejection or non-ejection from the orifices, that is, formation of the driving data of each orifice is determined each time, and the errors are accumulated.

Next, at the step S310, data I"xy are subtracted from the errors accumulated so far by means of the subtractor, and the result is set as new accumulated errors Exy. At next step S311, the lower 2 bits of the data I'xy are added to the accumulated errors Exy by means of the adder 107. At step S312, the result is distributed to other pixels as process errors in the specified pixel (x,y).

The above processing is represented by the following equations concretely.

Ixy=195, Sxy=2, thus I'xy=195+2=197 (see step S303)
I'xy=11000101 (binary)
Upper six bits=110001=49, lower two bits=01=1.
A=1:
  I"xy=49>threshold value 8 (see step S306), then Pxy="1", and nozzle memory 1 (orifice #100)→"1"
  Exy=63−49=14 (see step S307)
A=2:
  I"xy=49>threshold value 24, then Pxy="1", and nozzle memory 2 (orifice #68)→"1"
  Exy=14+63−49=28
A=3:
  I"xy=49>threshold value 40, then Pxy="1", and nozzle memory 3 (orifice #36)→"1"
  Exy=28+63−49=42
A=4:
  I"xy=49<threshold value 56, then Pxy="0", and nozzle memory 4 (orifice #4)→"0"
  Exy=42−49=−7 (see step S310)
  Exy=−7+1=−6 (see step S311)

As described above, the halftoning of the specified pixel (x,y) is represented by each liquid droplet ejected ("1") from three orifices #100, #68 and #36. The error Exy to be distributed when the five-level halftoning processing in the specified pixel is performed, is −6.

Figure 9:
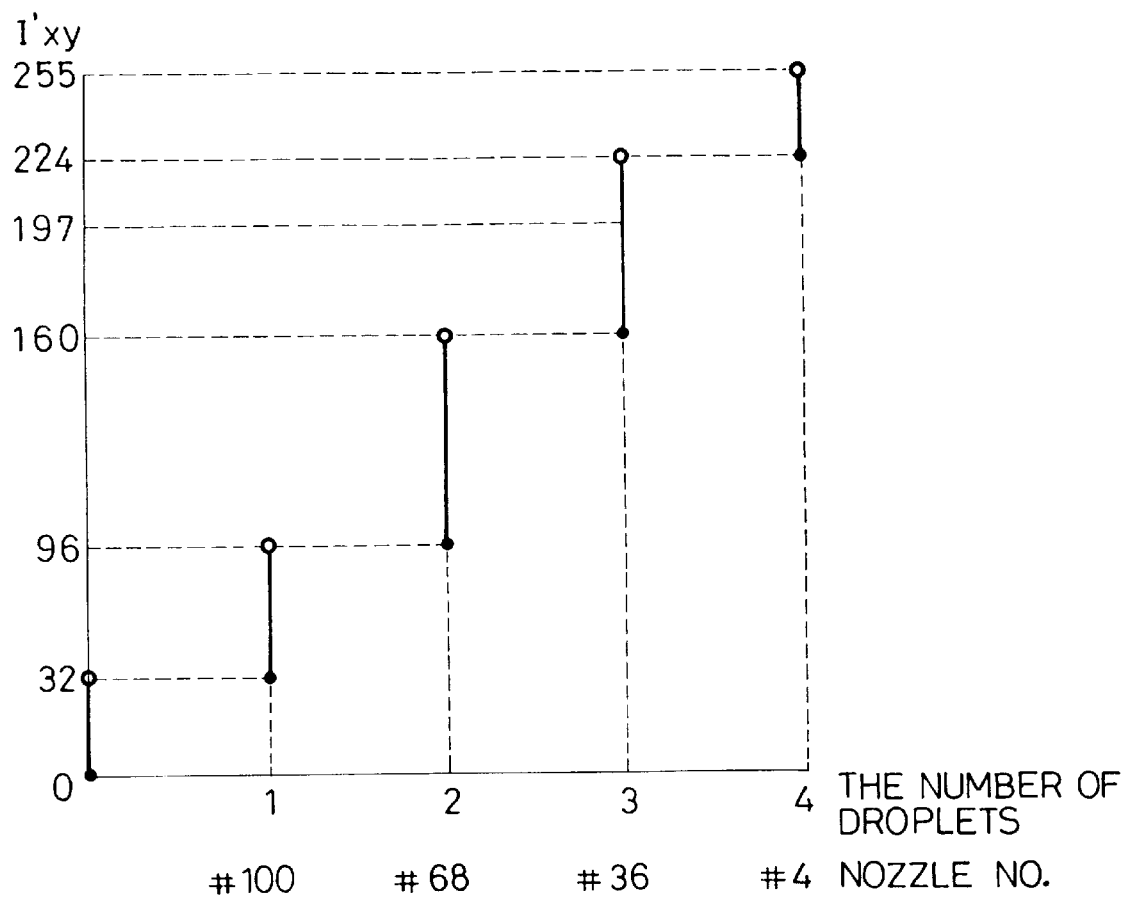
FIG. 9 shows a graph of the relation between input density level data and the number of droplets in embodiment 1.

The above result will be checked in light of FIG. 9. The input data Ixy is 195 and the error is +2, hence I'xy is 197. The pixel must be, therefore, formed by three liquid droplets. Accordingly, it can be seen that the above result accords with the relationship illustrating in FIG. 9.

It should be appreciated that the above method is not limited within the range of the present embodiment such that a single pixel may be formed by four orifices (recording elements), that is, the number of orifices is not limited to four, and that the above method is effective for such an approach that a single pixel may be formed by lots of orifices. In the above embodiment, the medium value of the density level corresponding to the number of the ejected liquid droplets was used as a threshold value (the actual threshold value is one-fourth of the density level data). It should be also appreciated that, in the case that the density level does not directly correspond to the number of ejected droplets, the threshold value may be set to adapt to the characteristic of the density level.

Embodiment 1A

Figure 10:
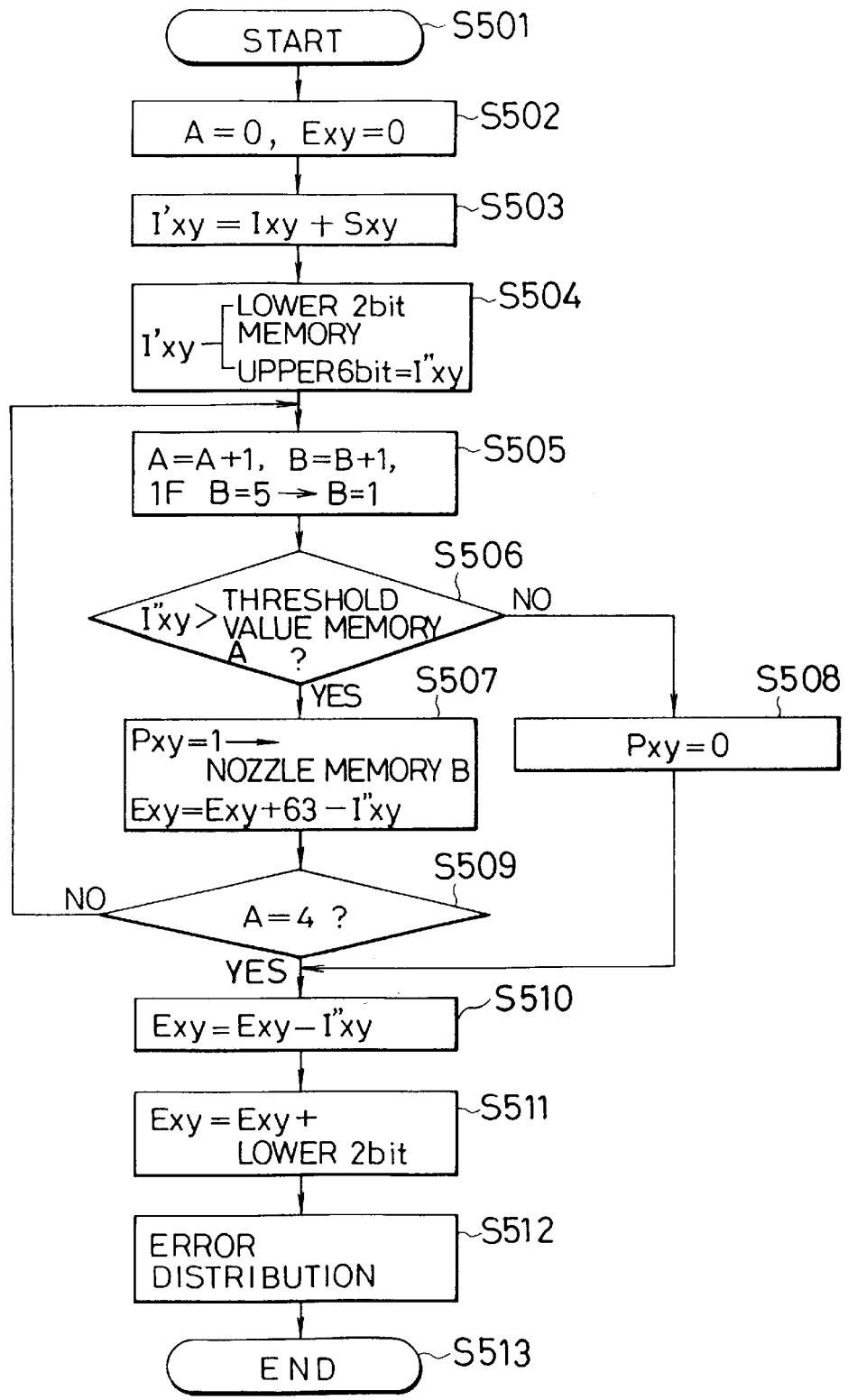
FIG. 10 is a flow chart illustrating the procedure of embodiment 1A of the present invention.

FIG. 10 is a flow chart illustrating the procedure of embodiment 1A of the present invention. The circuit structure of hardware is similar to that of embodiment 1 shown in FIG. 6.

Referring to FIG. 10, there is shown the difference between the flow chart of FIG. 10 and that of the embodiment 1 shown in FIG. 8. In embodiment 1A, there is provided another counter B besides the counter A. The nozzle memory is selected in accordance with the value of the counter B. The operation of embodiment 1A is the same as that of the embodiment 1 except this point. As shown at step S505, the counter B always has one of the count numbers 1 to 4 in succession. That is, the counter is not reset even when the specified pixel is changed, and continues to count. Thus the count number changes from 4 to 1.

By such structure, the assignment of the driving data of each of pixels to the nozzle memory does not always start from the same nozzle memory 1, that is, it starts from the nozzle memory next to one which the driving data "1" was assigned in a previous pixel (see step S507). In other words, even if the input data have the density level, the orifices to be selected change sequentially every specified pixel. Accordingly, it can be prevented that the same orifice is always used. For example, in the case that the density level of data is 127, it can be prevented that only the combination of the orifices #100 and #68 is used, accordingly, density speckles arising due to variance of an ejection characteristics among orifices.

Embodiment 1B

Figure 11:
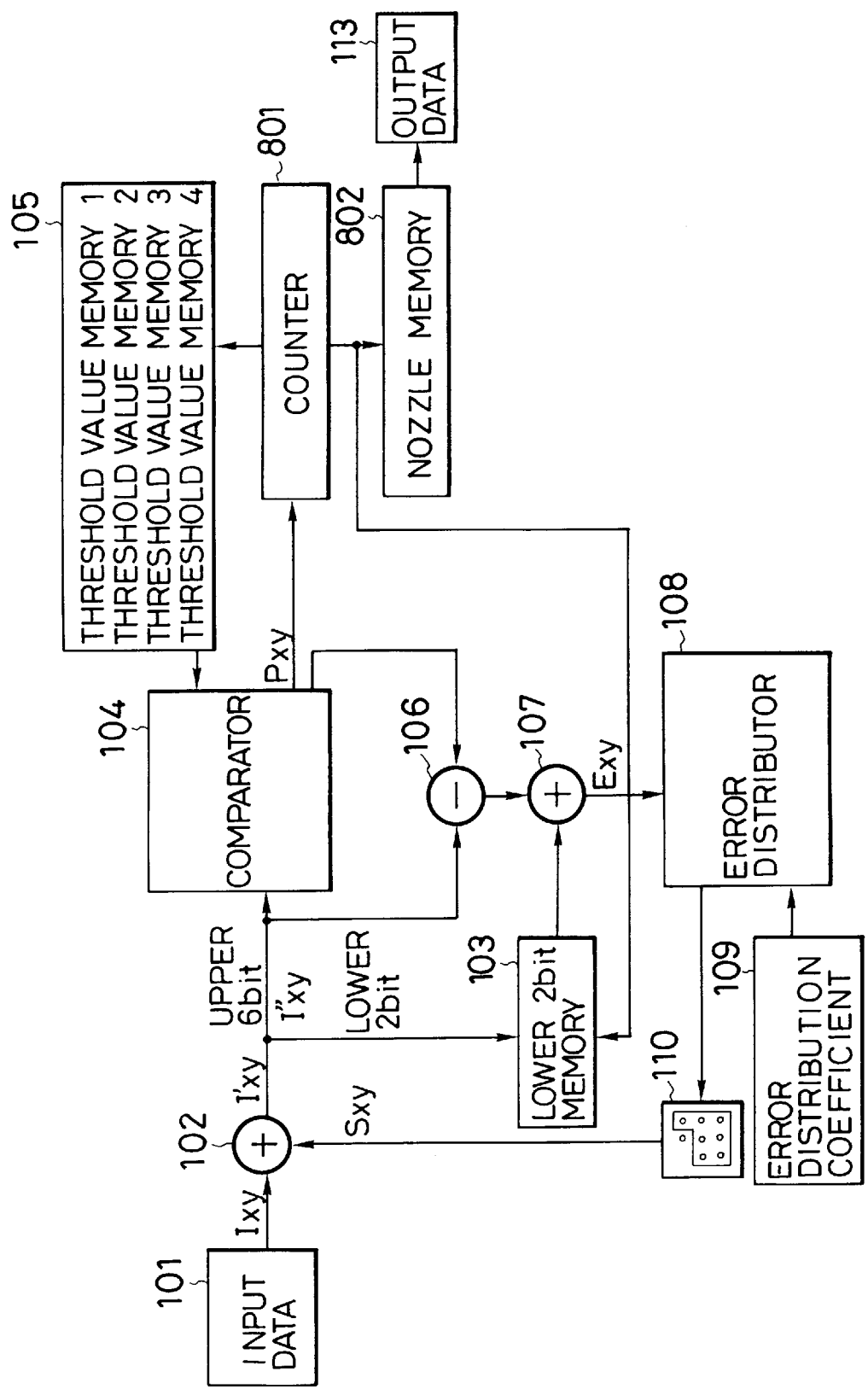
FIG. 11 is a block diagram of the construction of an image signal processing and a driving data assigning processing in embodiment 1B of the present invention.

FIG. 11 is a block diagram showing a signal processing structure according to embodiment 1B of the present invention. This embodiment relates to such a method that lots of liquid droplets which form one pixel are ejected not from a plurality of orifices, but from a single orifice. In FIG. 11, the same reference numeral as in FIG. 6 identifies corresponding elements. The present embodiment represents a construction for the five-level halftoning processing like embodiment 1.

Hereinafter, only parts different from embodiment 1 will be described. In FIG. 11, a reference numeral 801 denotes a 3 bit counter, which is reset to zero every pixel. Numeral 802 denotes a 3 bit nozzle memory of which initial value is reset to zero every pixel. The nozzle memory corresponds to one orifice with respect to one pixel. In the above construction, the counter 801 selects the threshold memory 1 in such a state that it is reset to zero. That is, the comparator 104 compares the value of the threshold value memory 1 with the input data I"xy. The result of comparison is outputted as Pxy like the embodiment 1. If this value is "1", the counter 801 adds "1" to the nozzle memory 802, while if it is "0", the counter 801 does nothing. Then, in order to move to the processing of the next pixel, the counter 801 informs the finish of the processing of the lower 2 bit memory, and moves to the processing of error diffusion. As described above, the counter 801 counts up to compare in order until the value of Pxy turns to "0". Of course, while this counter is a 3 bit counter, it can be reset to move the processing of the next pixel in the case that the comparison finishes four times before the Pxy turns to zero.

As described above, it should be noted that the present invention is effective in the case that a single pixel is formed by liquid droplets ejected, not from a plurality of orifices, but from a single orifice.

Embodiment 2

Figure 12:
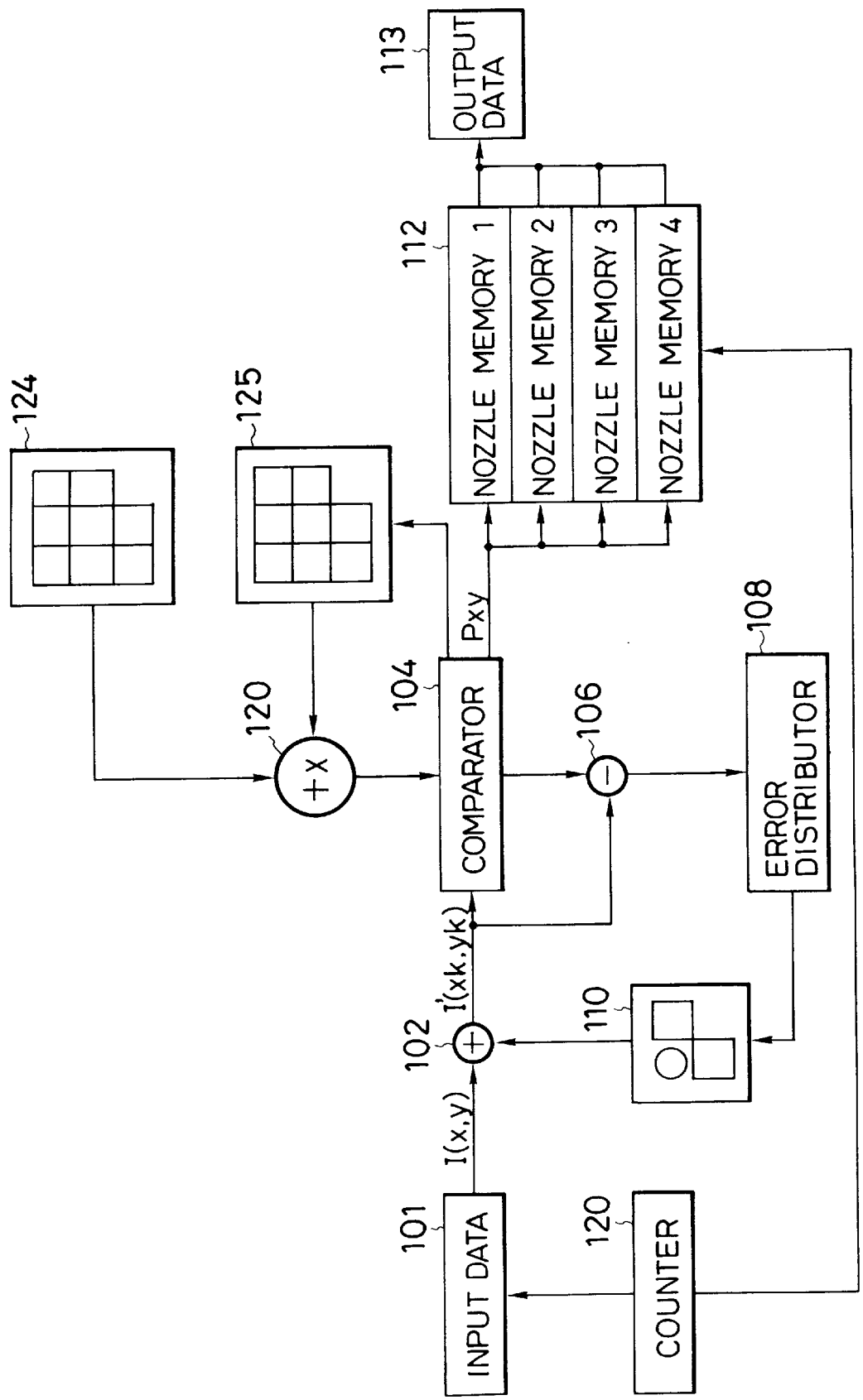
FIG. 12 is a block diagram of the structure of an image signal processing and a driving data assigning processing in embodiment 2 of the present invention.

FIGS. 12 is a block diagram showing the construction of an image data processing and an assignment processing of driving data according to embodiment 2 of the present invention, which is similar to FIG. 6 in embodiment 1. In FIG. 12, the same reference numerals as in FIG. 6 identify corresponding elements. Therefore, the description of those elements will be abbreviated. FIG. 13A is a schematic illustration of the pixel configuration illustrating a pseudo-halftoning processing of the present embodiment, FIG. 13B is a schematic illustration of a weighting mask used in the above processing, and FIG. 13C is a schematic illustration showing pixels that an error are distributed.

Referring now to FIG. 13A, 13B and 13C, described will be how to perform a pseudo-half-tone processing of five-level halftoning processing. In FIG. 13A, reference numeral 201 denotes the noted pixel (x,y) that the pseudo-halftoning processing is to be performed one. This specified pixel (x,y) is divided to four pseudo-pixels as shown at a dotted line. These pseudo-pixels are denoted by (x1,y1), (x2,y2), (x3,y3) and (x4,y4), respectively. The input data Ixy of the specified pixel (x,y) have 8-bit data representing density levels between 0 to 255. Numerals 202 to 208 each is a surrounding pixel of the specified pixel 201. In these pixels, the pseudo-halftoning processing have already been finished. In addition, these pixels are also divided into four pseudo-pixels as well. These surrounding pixels each has any one of values of 0 to 4 as a result of five-level halftoning processing. These values are distributed and maintained in each pseudo-pixel. Thus, the pseudo-pixels of each surrounding pixel have the value of either "0" or "1". A reference numeral 209 in FIG. 13B denotes a specified pseudo-pixel which is one of the pseudo-pixels of the specified pixel. Numerals 210 to 216 denote pseudo-pixels to be weighted with respect to the specified pseudo-pixel 209, to each of which weighting values R1 to R7 (a positive integer) corresponds. Reference numerals 217 and 218 in FIG. 13C denote pixels adjacent to the specified pseudo-pixel 209, to which the error produced in a pseudo-halftoning processing of the specified pseudo-pixel 209 is distributed. The present embodiment 2 relates to how to perform the pseudo-halftoning processing of the five-level halftoning processing, the processing of which would be performed sequentially from one pixel to another pixel, for example, a pixel (x,y), a pixel (x+1,y), a pixel (x+2, y) . . . . Referring now to FIGS. 13A, 13B and 13C, how to perform the pseudo-halftoning processing of embodiment 2 will be described hereinafter.

The pseudo-halftoning processing is performed in a direction from the adjacent pixel (x−1,y) 208 to the right to the pixel (x,y) 201. At first, the two-level halftoning processing is performed to the pseudo-pixel (x1,y1) of the specified pixel (x,y) 201. The threshold value for this two-level processing is determined by the calculation of the weighting mask of FIG. 13B and the surrounding pseudo-pixels of the pseudo-pixel (x1,y1). The error produced by the two-level halftoning processing is diffused on the pseudo-pixels 217 and 218. As described above, the pseudo-halftoning processing of this embodiment has the structure such that it is performed only to the pseudo-pixels. The two-level halftoning processing is performed four times to a single pixel, whereby the five-level halftoning processing can be obtained.

In accordance with the present embodiment as described above, because (n+1)-level pseudo-halftoning processing can be obtained by the structure of carrying out n times a two-level halftoning processing, it is possible to reduce the load on hardware, and to simplify the forming of driving data in the embodiments 1, 1A and 1B.

The effect of the present embodiment will be explained hereinafter. The value of each of the pseudo-pixels in which two-level halftoning processing is performed, namely "0" or "1", as described later, is set as driving data to the nozzle memory corresponding to each orifice at the same time as the above binarization. With respect to the specified pixel (x,y), explained will be how to perform the binarization with respect to four pseudo-pixels (x,y), (x2,y2), (x3,y3), and (x4,y4) of the specified pixel (x,y), and how to perform five-level halftoning processing of the specified pixel (x,y). The data of the specified pseudo-pixel (x1,y1) is equal to I'(x1,y1) that, the errors produced by the two-level halftoning processings in each of the next pseudo-pixel (x1,(y−1)1) to the upper side and the next pseudo-pixel ((x−1)4,y4) to the left side as shown in FIG. 13A, is added to the input data I(x,y) of the specified pixel (x,y). The two-level halftoning processing is performed to this data I'(x1,y1). The threshold value is mean density MV obtained by the following calculation.

MV=P((x−1)4, (y−2)4)*R1+P(x1, (y−2)1)*R2+P(x2,(y−2)2)*R3+P((x−1)4, (y−1)4)*R4+P(x1, (y−1)1))*R5+P(x2, (y−1)2)*R6+P((x−1)4, y4)*R7

The value P(x1,y1) by the two-level halftoning processing of this pseudo-pixel (x1,y1) is determined by comparing MV with I'(x1,y1). That is, If I'(x1,y1)≧MV, then P(x1,y1)="1"
If I'(x1,y1)<MV, then P(x1,y1)="0"

Next, the errors produced in this pseudo-pixel (x1,y1) is determined as follows.

When P(x1,y1)="1", ERROR=I'(x1,y1)−255
When P(x1,y1)="0", ERROR=I'(x1,y1)

This ERROR is diffused to the surrounding pseudo-pixel 217 and 218 which are the next pixels to the right side and to the lower side, respectively, as shown in FIG. 13C. The errors produced after the two-level halftoning processing at the specified pseudo-pixel (x1,y1) is performed, are diffused to pseudo-pixels (x2,y2) and (x1,(y+1)1), and are use for data of each pseudo-pixel. When the two-level halftoning processing of the specified pseudo-pixel (x1,y1) is finished, the processing of the pseudo-pixel (x2,y2) will be started. The processing of the pseudo-pixel (x2,y2) is similar to that described above, and after the pseudo-pixel (x2,y2) is processed, the value P (x2,y2) is determined to either "0" or "1". The data of the pseudo-pixel (x2,y2) equal to I'(x2,y2) that, the errors which are diffused to the specified pseudo-pixel (x2,y2) by the two-level halftoning processing in each of the pseudo-pixel (x2,(y−1)2) and the pseudo-pixel (x1,y−1), is added to the data I(x,y) of the specified pixel (x,y). The two-level halftoning processing is performed to this I'(x2,y2), in which the threshold value is mean density MV obtained by the following calculation.

MV=P(x1,(y−2)1)*R1+P(x2, (y−2)2)*R2+P(x3,(y−2)3)*R3+P(x1,(y−1)1)*R4+P(x2,(y−1)2))*R5+P(3,(y−1)3)*R6+P(x1, y1)*R7

The value P(x2,y2) of the two-level halftoning processing of this pseudo-pixel (x2,y2) is determined by comparing MV with I'(x2,y2). That is, If I'(x2,y2)≧MV, then P(x2,y2)="1"
If I'(x2,y2)<MV, then P(x2,y2)="0"

Next, the errors produced in this pseudo-pixel (x2,y2) is determined as follows.

When P(x2,y2)="1", ERROR=I'(x2,y2)−255
When P(x2,y2)="0", ERROR=I'(x2,y2)

This ERROR is diffused to the surrounding pseudo-pixel 217 and 218. The errors produced after the two-level halftoning processing at the specified pseudo-pixel (x2,y2) is performed, are diffused to pseudo-pixels (x3,y3) and (x2,(y+1)2), and used as data of each pseudo-pixel. As described above, after the two-level halftoning processing of the specified pixel (x2,y2) is finished, the processing of the pseudo-pixel (x3,y3) will be started. The above-mentioned process is also applied to the pixel (x3,y3), and then to the pixel (x4,y4), and the value P by two-level halftoning processing of each pseudo-pixel is obtained. Wherein, if all the two-level data P of four pseudo-pixels are "0", the five-level data of the specified pixel (x,y) are 0. If any one of the four pseudo-pixels are "1" and the others are "0", five-level data of the specified pixel (x,y) are 1. If any two of the four pseudo-pixels (x,y) are "1" and the other, two are "0", the five-level data of the specified pixel (x,y) are 2, if any three of the four pseudo-pixels are "1" and another pseudo-pixel is "0", the five-level data of the specified pixel are 3, and if all data of the four pseudo-pixels are "1", the five-level data of the specified pixel (x,y) are 4. After performing a series of the processing described above with respect to the specified pixel (x,y), the processing of the pixel (x+1,y) is started. In a manner similar to that described above, the two-level halftoning processing is performed on four pseudo-pixels ((x+1)1, y1), ((x+1)2, y2), ((x+1)3, y3), and ((x+1)4, y4), and then processing of pixel (x+2,y) is started. In this structure, the result of the pseudo-halftoning processing, "0" or "1", is output at every time the processing of each pseudo-pixel finishes performing. As described above, since the value P of each pseudo-pixel is either "0" or "1", it is not necessary to multiply the value P in the calculation of the mean density MV, thus reducing the load on hardware, etc.

Next, explained with reference to FIG. 12 will be how the driving data of the recording head are assigned to the orifices in the two-level halftoning processing of each pseudo-pixel. When the processing of the specified pixel (x,y) is started, the input data I(x,y) of the specified pixel is transferred to an adder 102. At this time the value of a counter 120 is 3, thus it points a memory 1. In order to obtain I'(x1,y1), I(x,y) is added in the adder 102 to the data from an error memory 110 that stores errors from the pseudo-pixel in which the two-level halftoning processing had been finished. On the other hand, the mean density is calculated in a multiplying and adding circuit 126 on the basis of the values from a weighting coefficient memory 124 and a pseudo-pixel memory 125 which stores the two-level data each corresponding to the pixel which the two-level halftoning processing has been performed. A comparator 104 compares the result of calculation in the multiplying and adding circuit 126 with the data I'(x1,y1) from the adder 102, and outputs either "0" or "1". At this time, the count of the counter 120 is 3, and it points the memory 1, thus, the result of comparison in the comparator 104 is stored in the nozzle memory 1. The two-level comparison result is also stored in the pseudo-pixel memory 125. At the same time, an error between the output I'(x1,y1) and 0 or 255, which corresponds to the comparison result "0" or "1" respectively, is calculated by a subtractor 106, and its difference is transferred to an error distributor 108, which distributes at a predetermined ratio and causes them to store in a memory section corresponding to the pseudo-pixels (x2,y2) and ((x+1)1, y1) of an error memory 110. The value in the memory may be used when on their pixels is performed pseudo-halftoning processing.

Next, the counter 120 counts down by 1, thus the counter 120 points a nozzle memory 2 of memory unit 112. The input data I(x,y) of the specified pixel are outputted from input data 101. Accordingly, the processing of the pseudo-pixel (x2,y2) of the specified pixel (x,y) is started, a series of the two-level halftoning processing described above is repeated, and the processing result is stored in the nozzle memory 2. When the series of the two-level halftoning processing of the pseudo-pixel (x2,y2) is completed, the counter 120 counts down by 1 again. The series of the above processing is repeated until the count of the counter 120 becomes zero, that is, it means that as to the specified pixel (x,y), the two-level halftoning processing of each pseudo-pixel is performed four times. As a result, either "0" or "1" is stored in each memory of a nozzle memory unit 112, thus the values of the nozzle memory 1 to 4 are outputted through output data 113 during scanning of each of recording heads. As explained hereinbefore, the results of the five-level halftoning processing (in fact, two-level halftoning processing of each pseudo-pixel) of the specified pixel (x,y) are stored as "0" or "1" in four different nozzle memories 1 to 4. Which memories store "1" indicative of ejection, are determined by the result of the two-level halftoning processing in each pseudo-pixel. According to the value of each nozzle memory, the absence or presence of the ejection from the orifice such as #100, #68, #36 and #4 forms an image.

Figure 14:
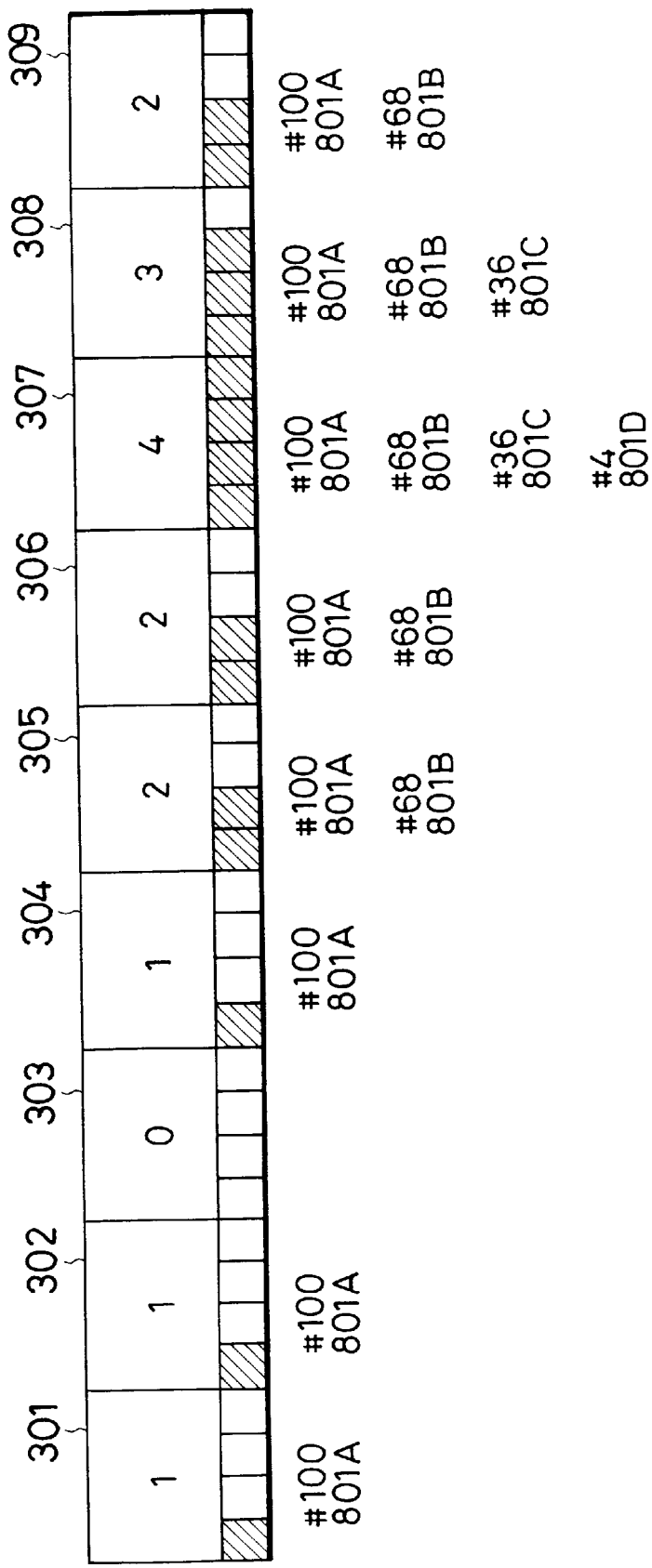
FIG. 14 is a schematic illustration illustrating the number of liquid droplet ejection, orifices to be used, and the scanning numbers of a recording head, which are used for forming pixels in embodiment 2.

Next, as to an actual pixel line, how the orifice to be used is assigned will be explained with reference to FIG. 14. FIG. 14 illustrates, in a direction of scanning of the recording head, a part of pixels formed by the ejection of ink droplets from orifices #100, #68, #36 and #4 respectively, in scannings 801A, 801B, 801C and 801D as shown in FIG. 6. In FIG. 14, reference numerals 301 to 309 each denotes a pixel, an inside number of each of which represents the number of ejection, that is, the result (value) of the five-level halftoning processing. In other words, that is the sum total of values of the two-level halftoning processing. Squares of the lower portion of each pixel 301–309 represent the pseudo-pixels in which the result "1" of the two-level halftoning processing is obtained. In addition, below each pixel, there is shown orifice numbers of orifices used in each pixel and scan number of scanning in which the respective orifices eject.

In the line of the pixels, when the processing in the pixel 301 starts, the procedure as described above is performed, and the result "1" of the processing of first pseudo-pixel is obtained. Thus, the result "1" is stored in the nozzle memory 1. After this, next processing starts, and the two-level halftoning processing of second pseudo-pixel is performed in a similar manner. The result of the processing of the second pseudo-pixel is "0", thus this value "0" is stored in the nozzle memory 2. The two remaining pseudo pixels also are performed in order in a similar manner, and the results of the processing are stored in order respectively, in the nozzle memories 3 and 4. That is, the pixel 301 is formed by ejection from the orifice #100 during the scanning 801A, and then the processing of the pixel 302 starts, the two-level halftoning processing is performed to each of its pseudo-pixels. Also with respect to the pseudo-pixel 302, the result of a first pseudo-pixel is "1" and the others are "0".

The pixel 302 is, therefore, formed by ejection from the orifice #100 during the scanning 801A. The two-level halftoning processing is repeated four times in each pixel, and the scanning to form a pixel and the orifice to be used are determined. An example of another pixel will be explained hereinafter. For example, the number of ejection in connection with pixel 304 is 1, and the result of a first pseudo-pixel is "1". Thus, the pixel 304 is formed by ejection from the orifice #100 during the scanning 801A. The number of ejection in connection with pixel 305 is 2, and the results of a first pseudo-pixel and a second one are "1". Thus, the pixel 305 is formed both by ejection from the orifice #100 during the scanning 801A and by ejection from the orifice #68 during the scanning 801B.

As described above, according to embodiment 2, it is not necessary to perform the complicated five-level halftoning processing. In other words, the two-level halftoning processing is carried out to each pseudo-pixel and its result makes the value of the five-level halftoning processing, whereby it is possible to gain the same effects as the five-level halftoning processing.

Embodiment 2A

Figure 15:
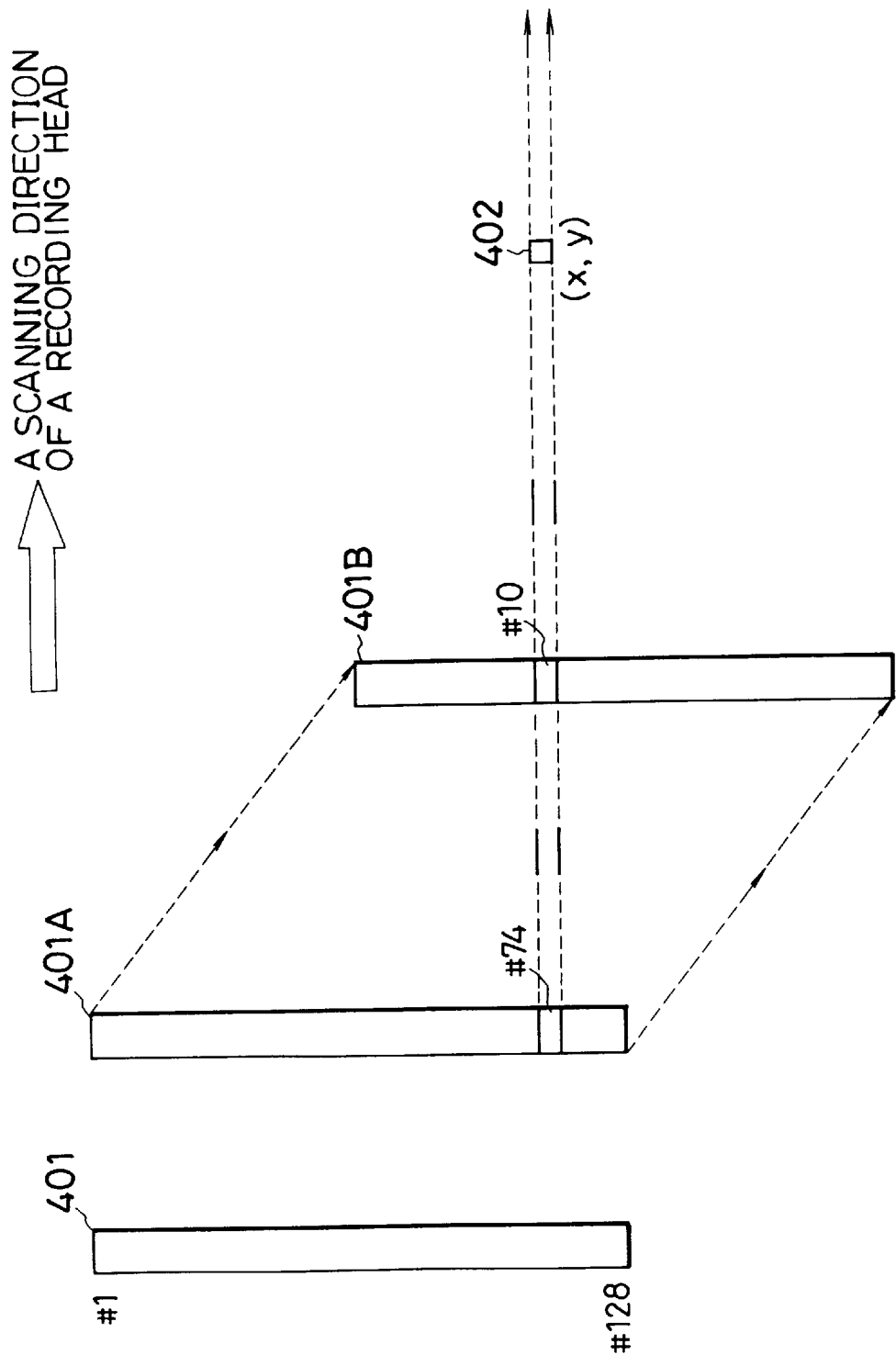
FIG. 15 is a schematic illustration illustrating a method of scanning a recording head in embodiment 2A of the present invention.
Figure 16:
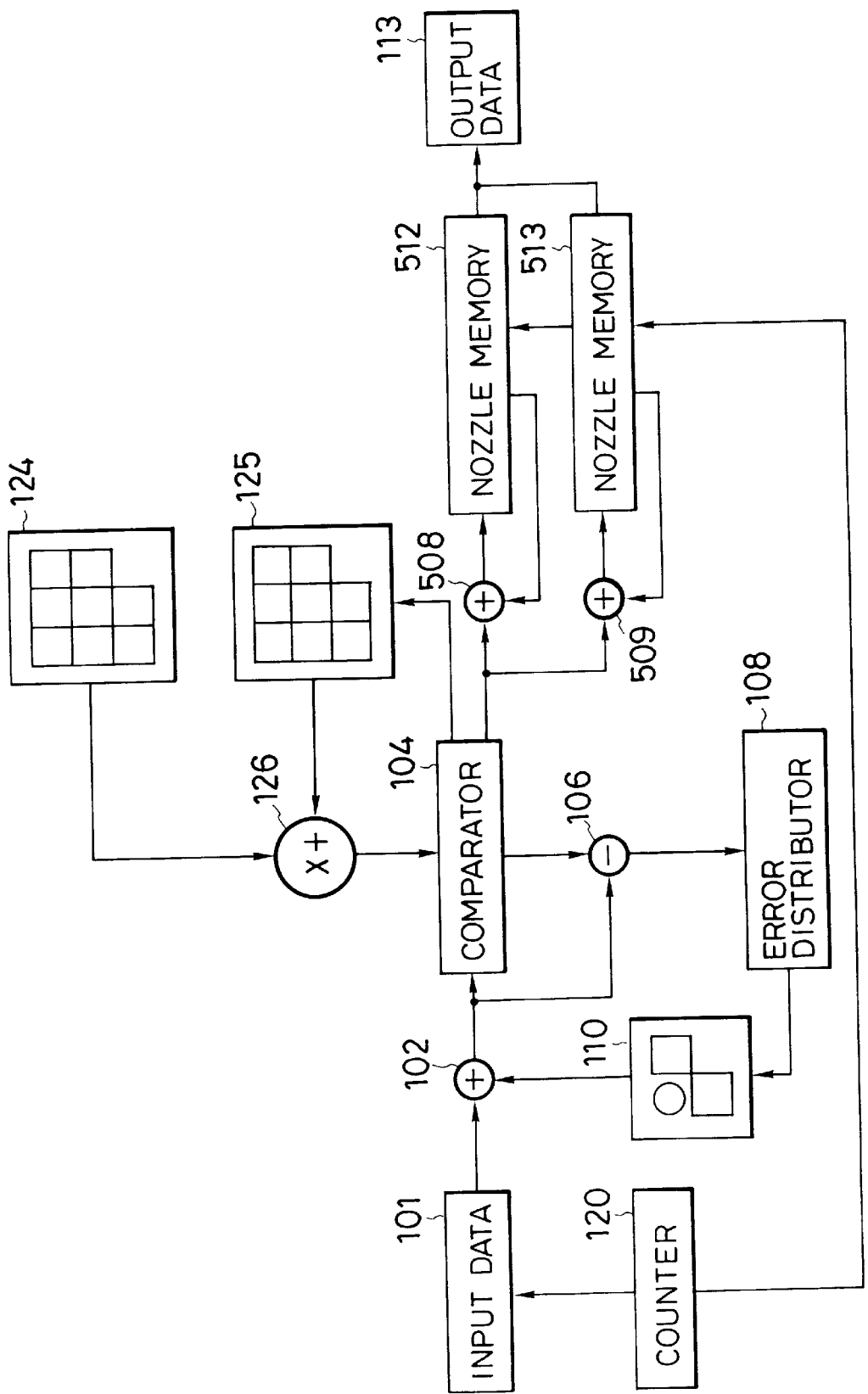
FIG. 16 is a block diagram of the structure of a image signal processing and a driving data assigning processing in embodiment 2A of the present invention.
Figure 17:
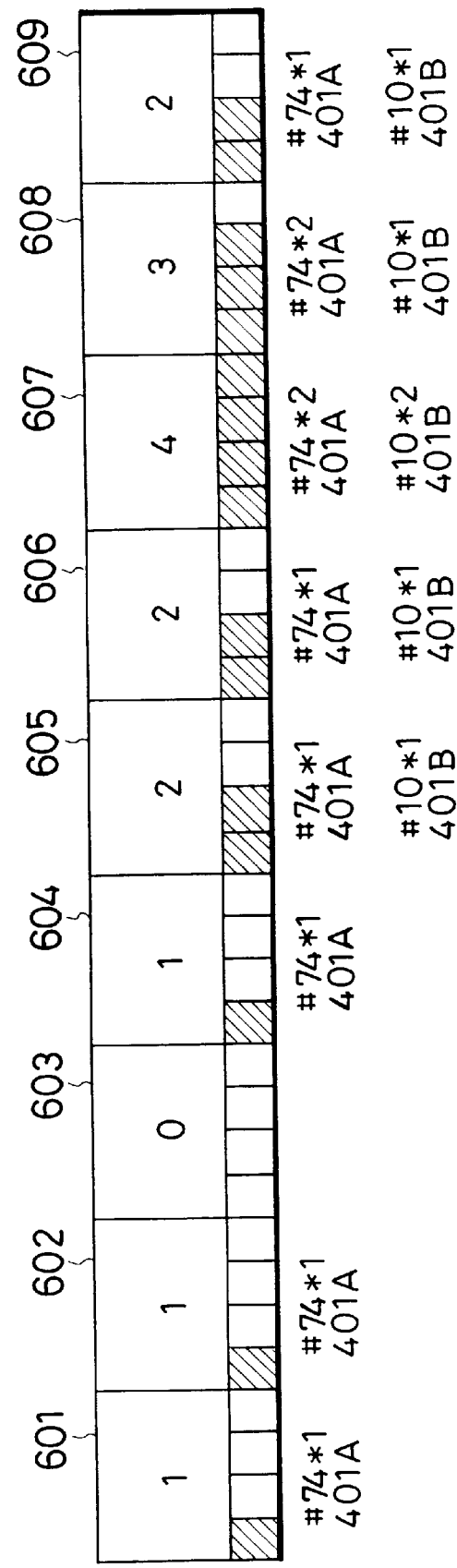
FIG. 17 is a schematic illustration illustrating the number of liquid droplet ejection, orifices to be used, and scanning numbers of a recording head, which are used for forming pixels in embodiment 2A.

FIGS. 15, 16 and 17 are illustrations illustrating embodiment 2A of the present invention. FIG. 15 is a schematic illustration illustrating a process of forming a single picture with droplets ejected from two orifices. Different from the method as shown in FIG. 15, there are cases where each orifice ejects twice to one pixel during single scanning. In FIG. 15, a recording head 401 is scanned from left to right of FIG. 15, and ejects ink droplets when necessary, forming an image. Reference numeral 401A denotes a position at the beginning of scanning, 401B scanning next to 401A, and 402 a single specified pixel. The number prefixed by a mark # at the recording head represents each of 128 orifices. In the above structure, the density level of a single specified pixel (x,y) 402 is expressed by one or two ejections or by non-ejection from each of orifice numbered #74 and #10 during twice scanning 401A and 401B of the recording head 401. For example, when both of two orifices do not eject, the density level of the specified pixel (x,y) 402 is minimum, when the two orifices each ejects twice, that is maximum. In addition, the medium density level between the maximum level and the minimum level is, of course, formed by the combination of the absence or presence of ejection from each orifice. This embodiment also relates to the same five-level pixel forming method as each embodiment described above, in which the numbers 0 to 4 of ejection can be obtained by the sum total of the two-level halftoning processing such as the dither method, the error diffusion method like the above embodiment 2, and stored in the nozzle memories. These values (driving data) are read out every scanning, thus the pixel can be formed.

Now, the ejecting timing to the pixel 402 of the orifices #74 and #10 during each of scanning 401A and 401B of the recording head 401, is obtained by pulses of an encoder, etc. indicative of the relationship of the position between the recording head and the medium to be recorded, in which resolution is set such that it may be possible to eject at least twice to a single pixel. The medium to be recorded of which volume corresponding to 128/2=64 orifices in a subscanning direction is transferred to the recording head between scannings 410A and 401B. In other words, the images corresponding to 128 orifices are recorded by twice scanning of the recording head.

Referring next to FIG. 16, there will be explained embodiment 2A of the present invention using a scanning method shown in FIG. 15. In FIG. 16, nozzle memories 512 and 513 each is a line memory with 2 bits, which correspond to a line of pixels. The nozzle memory 512 corresponds to ejection from the orifice #74, and the nozzle memory 513 to ejection from the orifice #10. Thus the memory is selected by the value of the counter 120 like embodiment 2. For example, if the value of the counter 120 is an odd number, the nozzle memory 512 can be selected, and if that is an even number, the nozzle memory 513 can be selected. A reference numeral 508 denotes an adder, which adds the value from the comparator 104 to the value already stored in the nozzle memory 512, and stores it again in the nozzle memory 512. A reference numeral 509 also denotes an adder, which adds the value from the comparator 104 to the value already stored in the nozzle memory 513, and stores it again in the nozzle memory 513. In the present embodiment, when the object of the processing changes to another pixel, the nozzle memory corresponding to a first pixel is reset to zero. Further, the five-level pseudo-halftoning processing method is the same as the method described in embodiment 2, in which the two-level halftoning processing is performed four times. The orifice and the number of scanning corresponding to each pseudo-pixel are as follows. That is, the driving data of the pseudo-pixel (x1,y1) shown in FIG. 13A is used by the orifice #74 during the scanning 410A, that of the pseudo-pixel (x2,y2) is used by the orifice #10 during the scanning 410B, that of the pseudo-pixel (x3,y3) is used by the orifice #74 during the scanning 410A, and that of the pseudo-pixel (x4,y4) is formed by the orifice #10 during the scanning 410B.

There will be explained hereinafter how each pseudo-pixel and its corresponding orifices to be used is determined in the above structure. At the beginning, when the processing of the specified pixel (x,y) is started, the input data I(x,y) of the specified pixel are transferred from the input 101 to the adder 102. At this time, the value of the counter 120 is 3, which points the nozzle memory 512. In the adder 102, I'(x1,y1) is obtained by adding I(x,y) to data from the error memory 10 storing errors from the pseudo-pixels in which the two-level halftoning processing has already been performed. Meanwhile, mean density is calculated by the multiplying and adding circuit 126 in the same manner as embodiment 2. The comparator 104 compares an output of the multiplying and adding circuit 126 with the output data I'(x1,y1) of the adder 102, and outputs "0" or "1". At this time, the value of the counter 120 equals to 3, and thus points the nozzle memory 512. According, the output of the comparator 104 is stored in the nozzle memory 512 through an adder 508. In the beginning, value "0" is stored in the memories 512 and 513, and, hence the value from the comparator 104 is stored as it is. At the same time, the output I'(x1,y1) of the adder 102 and a value 0 or 255 are compared by the subtractor 106, and the difference is transferred to the error distributor 108, which distributes the difference or error at a predetermined ratio, and causes them to store in memories of the error memory 110 corresponding to the pseudo-pixel (x2,y2) and the pseudo-pixel ((x+1)1, y1). Values of these memories can be used when the object of the pseudo-halftoning processing changes to the concerned pixel. Next, the counter is counted down by 1, of which the value becomes 2, thus points the memory 513. Next, data I(x,y) of the specified pixel (x,y) is outputted from the input 101. Then, the processing of the next specified pseudo-pixel (x2,y2) of the specified pixel (x,y) is started, a series of the above two-level halftoning processing are repeated, and the result is stored in the nozzle memory 513 through an adder 509. Just after the series of two-level halftoning processing is performed, the counter 120 is counted down by 1 again, and then points the memory 512. The same processing as that of the pseudo-pixel (x1,y1) is repeated in the specified pseudo-pixel (x3,y3). The value stored in the nozzle memory 512 according to the result of the two-level halftoning processing and the result of this processing of the pseudo-pixel (x3,y3) is added by the adder 508, producing a final value of the nozzle memory 512. Similarly to the pseudo-pixel (x4,y4), the results of the pseudo-pixel (x2,y2) and the pseudo-pixel (x4,y4) are added by the adder 509, producing a final value of the nozzle memory 513. The series of the above processing is repeated until the counter is counted down to zero. The two-level halftoning processing of each pseudo-pixel is performed four times to the specified pixel (x,y), and any one of values of 0, 1 or 2 is stored to each of the memories 512, 513.

Referring to FIG. 17, there will be explained how orifices to be used are assigned with respect to an actual pixel line. FIG. 17 is a schematic illustration similar to FIG. 14 of the embodiment 2.

FIG. 17 shows a part of a pixel line in a direction of scanning, in which the pixel line is composed of a plurality of pixels formed by each of orifices #74 and #10 during respective scanning 401A and 401B. When, for example, the processing of the pixel 601 in the above pixel line starts, two-level halftoning processing is performed to a first pseudo-pixel of the pixel 601. A threshold value for two-level processing can be determined by using a weighting mask and values of surrounding pixels of the pseudo-pixel, in which the two-level halftoning processings have already been performed. Next, errors from the surrounding pixels are added to original data of a pixel 601, and this addition is compared with the threshold value. Because the input data to which is added an error is larger than the threshold value in this first pseudo-pixel, the result of comparison may become "1". And then the processing of the next pseudo-pixel of the pixel 601 is started, two-level halftoning processing is performed in a similar manner. The result of the second pseudo-pixel becomes "0". In a similar manner, the two-level halftoning processing is performed also to the others or two pseudo-pixels, of which the results are stored in the nozzle memories 512 and 513. Thus the pixel 601 is formed by one ejection from the nozzle #74 during the scanning 401A. After the pixel 601 was processed, the processing of pixel 602 is started, in which two-level halftoning processing is performed to each of pseudo-pixels in a manner similar to that of the pixel 601. In the pixel 602, the value of the processing of a first pseudo-pixel is "1", that of the others is "0". Thus, the pixel 602 is formed by a single ejection from the orifice #74 during the scanning 401A. As described above, the two-level halftoning processing is performed to each of the pseudo-pixels, that is, of which processing may be performed four times to each pixel, as a result, the scanning and orifices to be used for forming a pixel are determined. As to other pixels, for example, the number of ejection in the pixel 604 is 1 and the value of processing of a first pseudo-pixel is "1", thus the pixel is formed by one ejection from the orifice #74 during the scanning 401A. The number of ejection in the pixel 605 is 2 and the values of processing of the first pseudo-pixel and the second one are "1", thus the pixel is formed by both one ejection from the orifice #74 during the scanning 401A and one ejection from the orifice #10 during the scanning 401B. Further, the number of ejection in the pixel 604 is 3 and the values of processing of the first, the second and the third pseudo-pixels is "1", thus the pixel is formed by both twice ejection from the orifice #74 during the scanning 401A and one ejection from the orifice #10 during the scanning 401B.

Embodiment 2B

Figure 18:
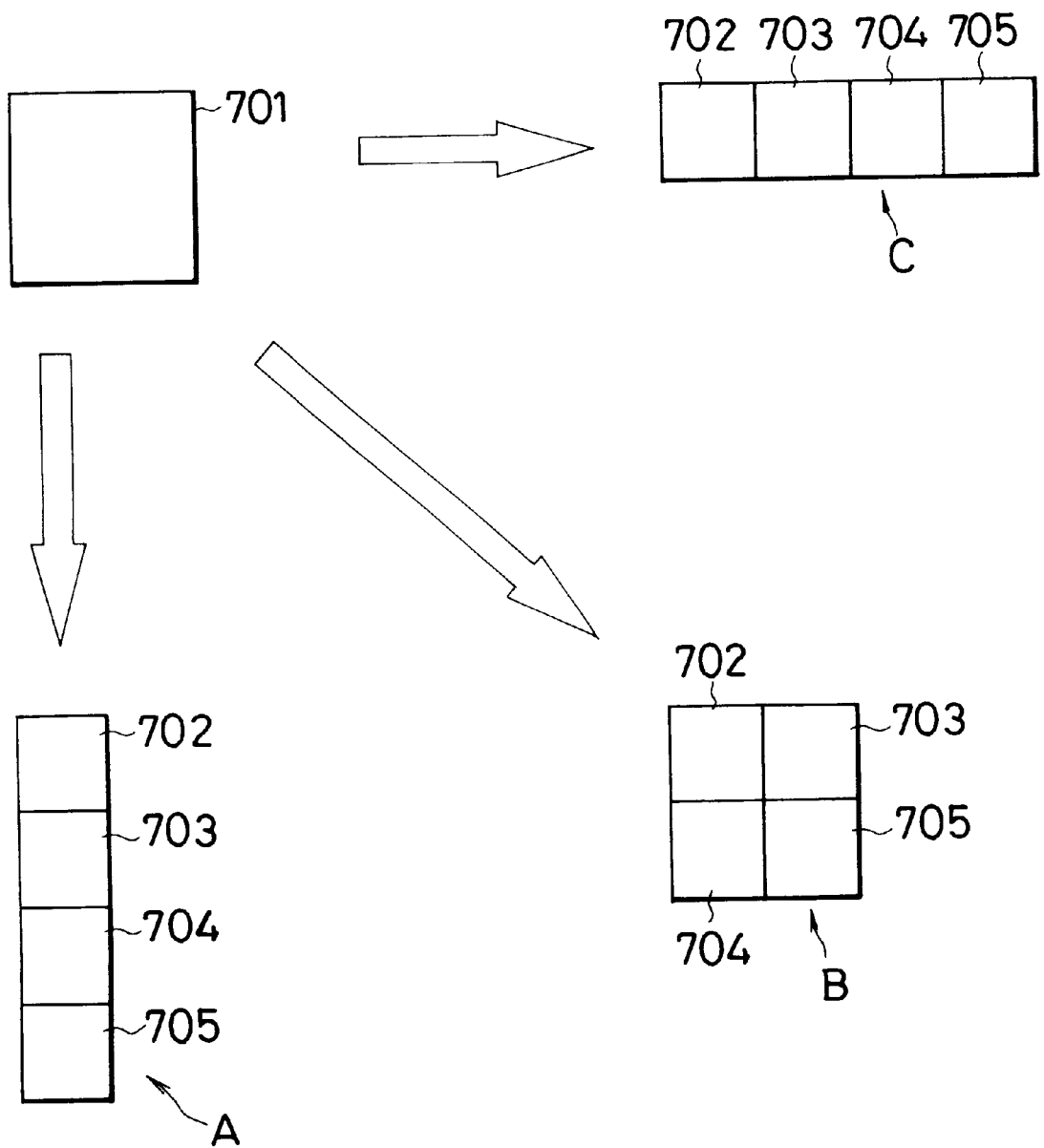
FIG. 18 is a schematic illustration illustrating a separating method of a pixel in embodiment 2B of the present invention.

FIG. 18 is a schematic illustration illustrating embodiment 2B of the preset invention, in which A and B denote how to divide the specified pixel (x,y) into pseudo-pixels, and C denotes a pixel dividing method shown in embodiment 2 and 2A described above. In FIG. 18, a reference numeral 701 denotes a specified pixel (x,y) to be processed, 702, 703, 704 and 705 are pseudo-pixels made by dividing the specified pixel into four pixels. In these embodiments, two-level halftoning processing is performed in a manner similar to embodiment 2 and 2A. In particular, if it is possible to divide as B in FIG. 18, there is an advantage that the pseudo-halftoning processing such as the dither method can be performed in the same way with the two-level halftoning processing. In the above pixel dividing method, with regard to which nozzle memories are assigned to each of the pseudo-pixels, that is, which orifices give ejection composing the pixel, it is possible to simplify in accordance with its hardware.

Embodiment 2C

Figure 19:
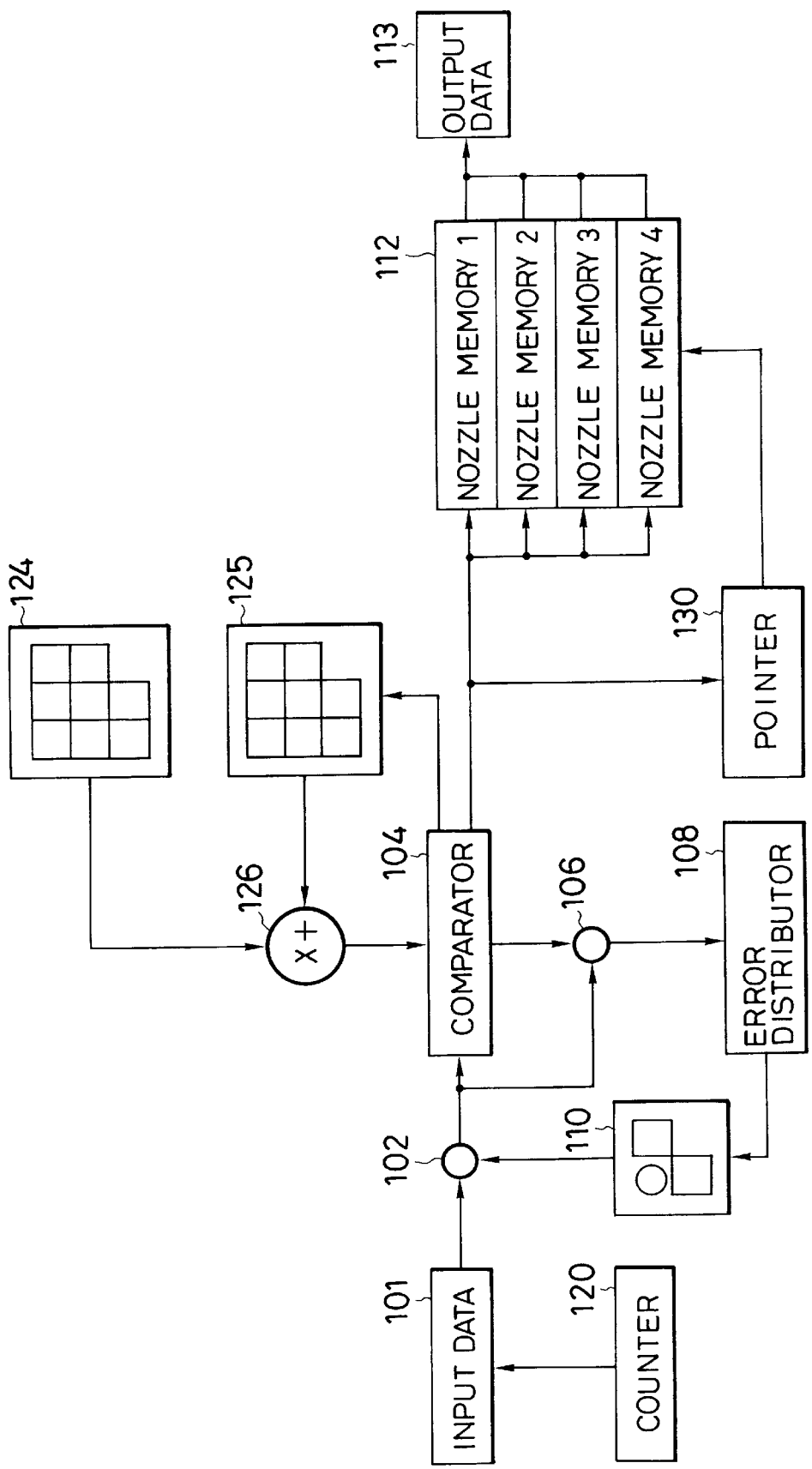
FIG. 19 is a block diagram of the structure of an image signal processing and a driving data assigning processing in embodiment 2C of the present invention.

FIG. 19 is a block diagram showing the structure of image data processing according to embodiment 2C of the present invention. In FIG. 19, a reference numeral 130 denotes a pointer having such the structure that points any one of the nozzle memories 1 to 4. More concretely, the pointer 130 points in order the nozzle memories 1 to 4, and it points the nozzle memory 1 after the nozzle memory 4. The pointer 130 changes in order the memories to point in response to output of the comparator 104. In other words, when the output of the comparator 104 equals "1", the nozzle memory number of the memory to be pointed is incremented by 1, and when the output equals to "0", that number is not changed. Because, by the structure described hereinbefore, the nozzle memories can be selected in order independent of the pseudo-pixel to be processed, only specific orifices to record an image as shown in FIGS. 14 and 17 can be prevented from being used.

Figure 20:
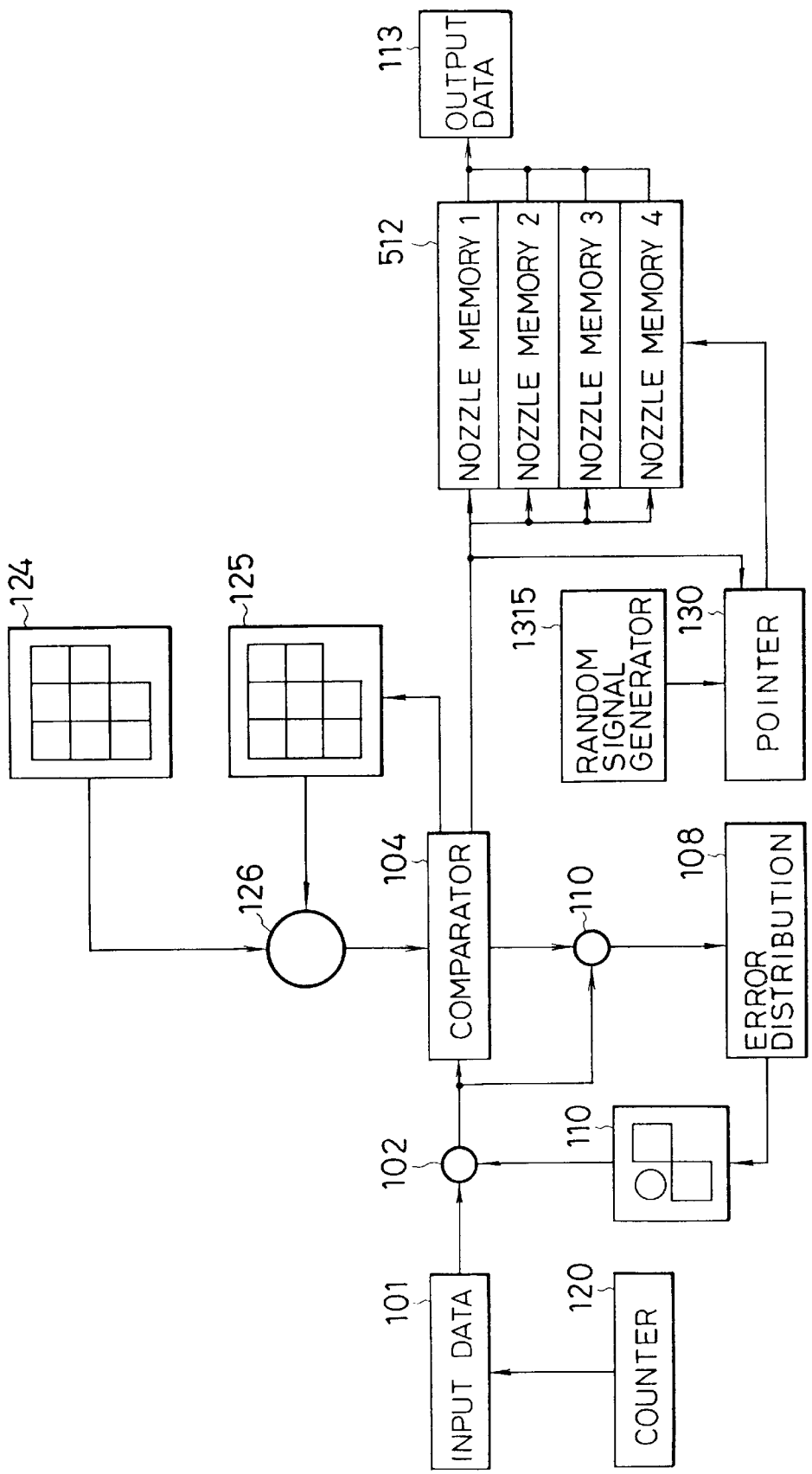
FIG. 20 is a block diagram of the structure of an image signal processing and a driving data assigning processing in a further embodiment of the present invention.

Alternatively, the nozzle memory pointed by the pointer 130 may be selected by a signal from a random signal generator 1315 as shown in FIG. 20. According to this structure, it is possible to select at random the nozzle memory in the course of processing of the pseudo-pixel. As a similar structure, the nozzle memory pointed at the beginning of processing of the specified pixel can be selected in accordance with a pixel position signal from a pixel position signal generator 1415 as shown in FIG. 21.

Figure 21:
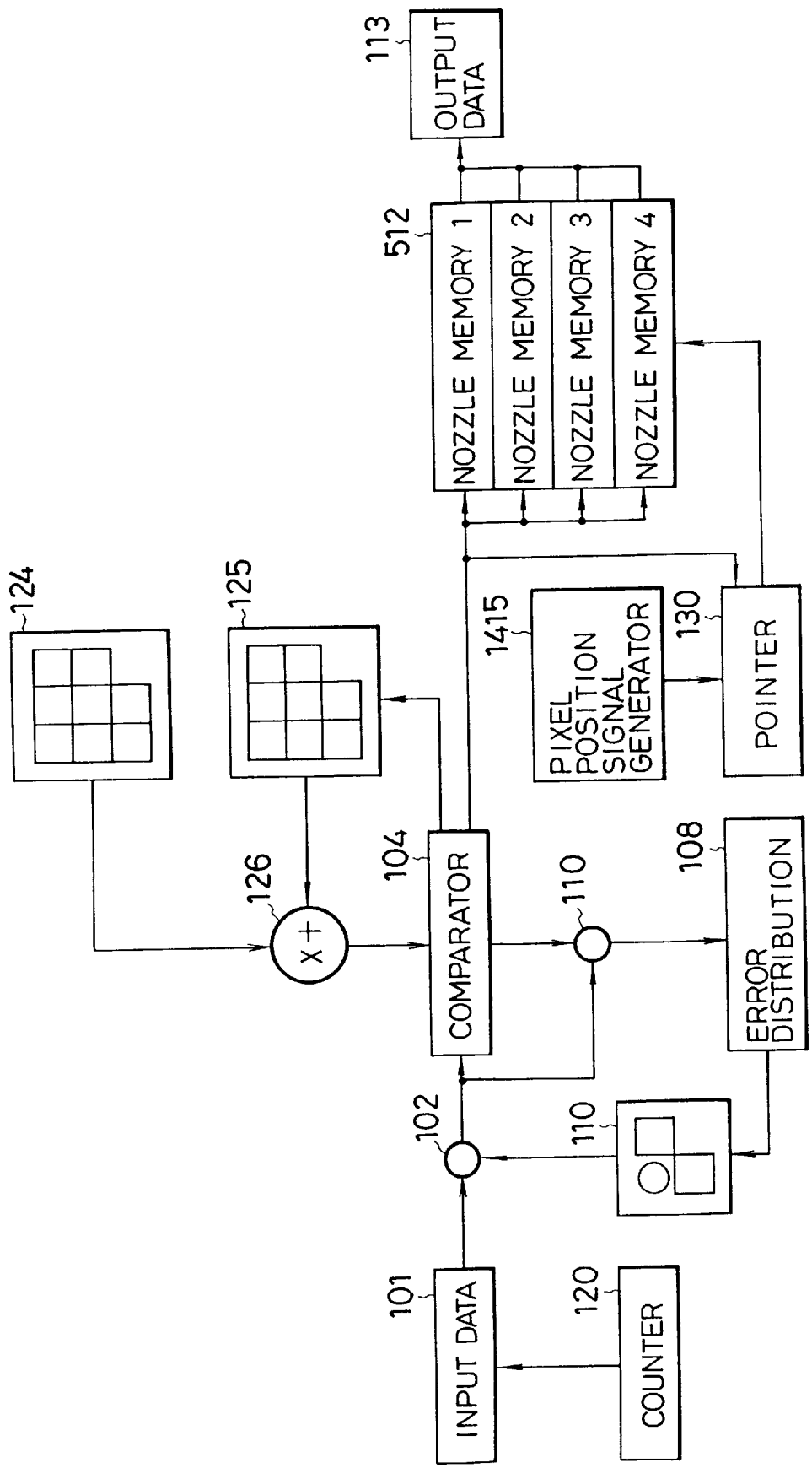
FIG. 21 is a block diagram of the structure of a image signal processing and a driving data assigning processing in a still further embodiment of the present invention.
Figure 22:
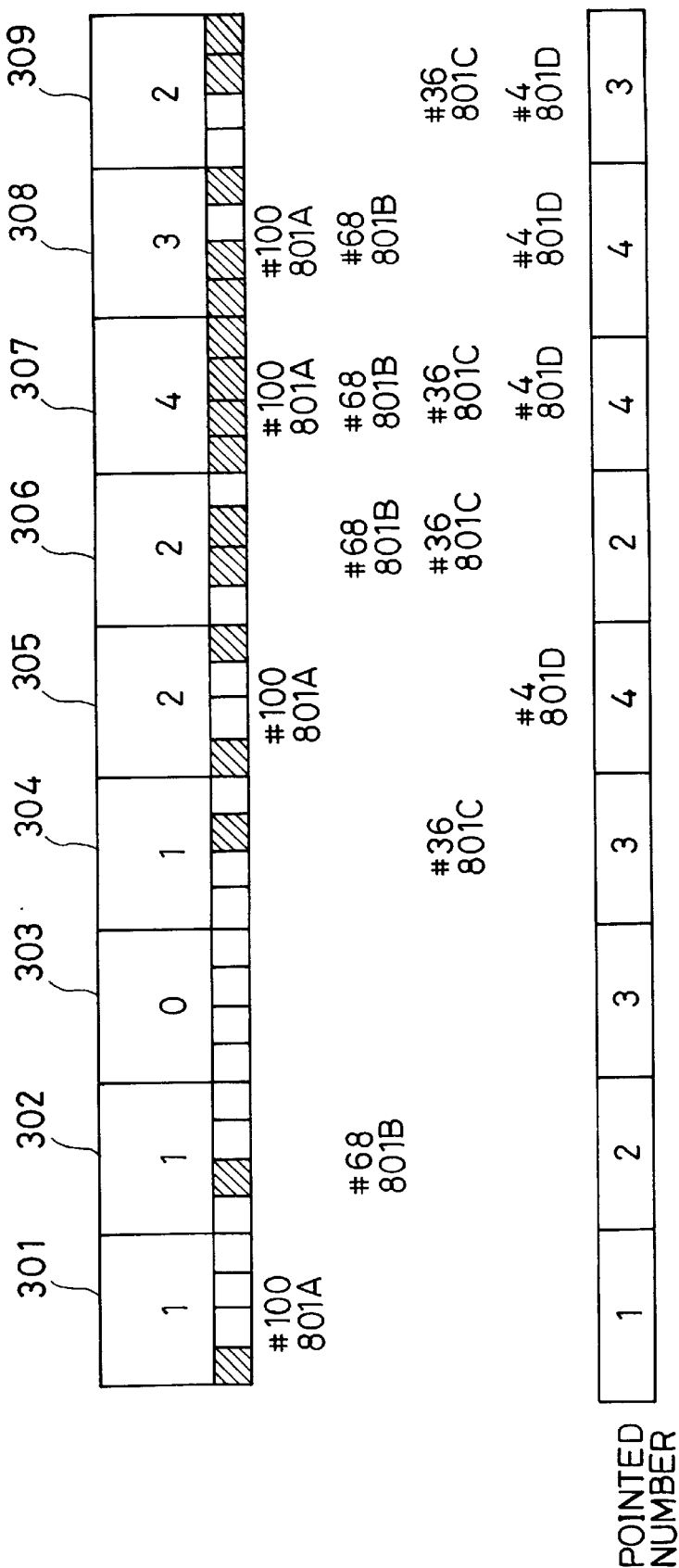
FIG. 22 is a schematic illustration illustrating the number of liquid droplet ejection, orifices to be used, and scanning numbers of a recording head, which are used for forming pixels in embodiment shown in FIG. 19.
Figure 23:
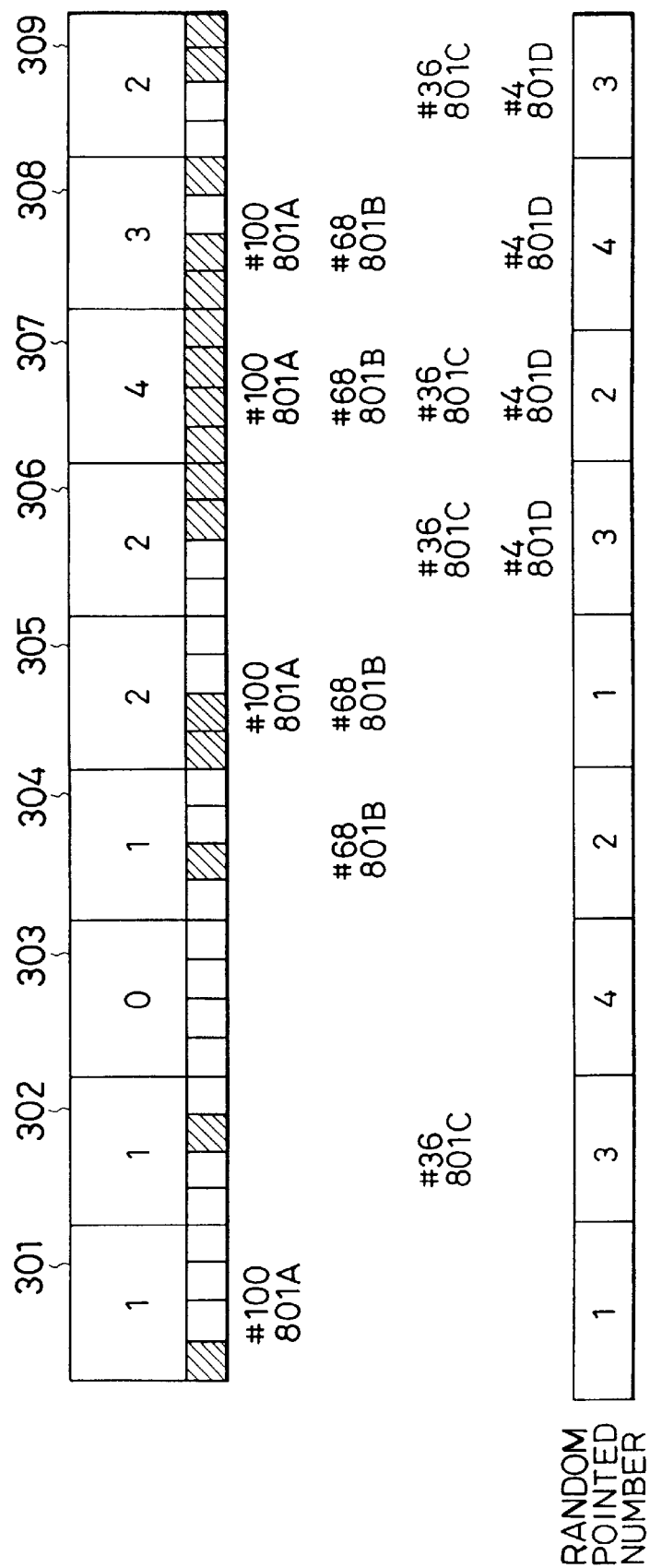
FIG. 23 is a schematic illustration illustrating the number of liquid droplet ejection, orifices to be used, and scanning numbers of a recording head, which are used for forming pixels in embodiment shown in FIG. 20.
Figure 24:
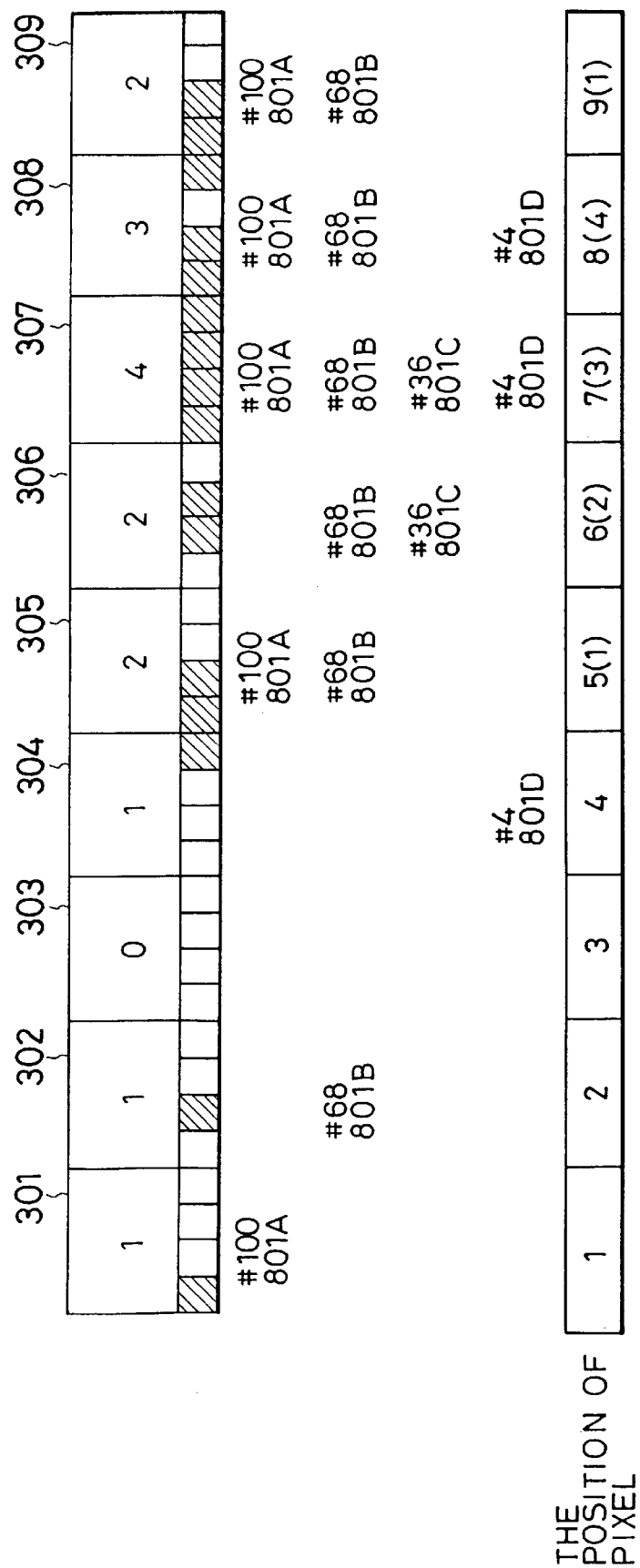
FIG. 24 is a schematic illustration illustrating the number of liquid droplet ejection, orifices to be used, and scanning numbers of a recording head, which are used for forming pixels in embodiment shown in FIG. 21.

FIGS. 22, 23 and 24 are schematic illustrations illustrating assignment of scanning and orifices to each pixel in the structure shown in FIGS. 19, 20 and 21, respectively. As seen in these drawings, the orifices to be used can be distributed so that only specific orifices can be prevented from being used.

It should be appreciated that, when connecting the power to the apparatus, when recording on a new recording sheet, and when scanning of the recording head starts, the pointer 130 may be reset. That is, it may point the nozzle memory 1, or, only at that time, the nozzle memory may be selected at random by a signal from the random signal generator 1315, or the nozzle memory may be selected in response to an address of the pixel from the pixel position signal generator 1415 shown in FIG. 21. Same effects can be obtained by these selections.

In case that an orifice of non-ejection (malfunction) or an orifice which ejects ink droplets to a recording paper in different directions is known in advance, the corresponding number of the pointer can be skipped, an alternative orifice can be used.

Further, in the case that the two-level halftoning processing is performed to each pseudo-pixel, the error distribution equals each pseudo-pixel in the above embodiments. However, it should be appreciated that any distribution method can be used so long as the density level of image is maintained as a whole. Accordingly, it is possible to change the error distribution ratio to each pseudo-pixel.

Further, although the halftoning reproducing method in the embodiments described above is explained by the error diffusion method of the dither method, mean error minimum method, pixel distribution method in meshes, multi-stage division quantization method, MECCA method, CAPIX method, etc. can be applied to the present invention.

In addition, in the above embodiments, the pixel was formed with four liquid droplets, however the pixel can be formed also by using any number of orifices more than two. Moreover, the application of the present invention is not limited to an ink jet recording apparatus, and is applicable to a dot type of printer such as a thermal printer.

Further, in the above embodiments, the number of orifices to one picture is $2^n$, however, four-level processing by three orifices and six-level processing by five orifices are easily obtained by using many kinds of comparators and threshold values.

The present invention achieves distinct effects when applied to a recording head or a recording apparatus which has means for generating thermal energy such as electro-thermal transducers or laser light, and which causes changes in ink by the thermal energy so as to eject ink. This is because such a system can achieve a high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laid-open Nos. 123670/1984 and 138461/1984 in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. As examples of the recovery system, are a capping means and a cleaning means for the recording head, and a pressure or suction means for the recording head. As examples of the preliminary auxiliary system, are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Patent Application Laid-open Nos. 56847/1979 or 71260/1985. The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, as an output device of a facsimile apparatus having a transmission and receiving function, and as an output device of an optical disc apparatus for recording and/or reproducing information into and/or from an optical disc.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A recording apparatus for recording an image on a recording medium by using a recording head having a plurality of recording elements, said apparatus comprising:

driving means for driving the plurality of recording elements of the recording head in accordance with driving data so as to form dots; and n-level halftoning processing means, where n−1=the maximum number of the driving data for forming the dots on a pixel, for converting input image data into the driving data of each pixel, said n-level halftoning processing means including (a) two-level processing means for converting the input image data corresponding to each of the pixels into data of two levels based on a threshold value, (b) assigning means for assigning a result of the conversion performed by said two-level processing means as the driving data for a single pixel to a different one of the plurality of recording elements, and (c) repeating means for repeating both of the conversion of the input image data into the data of two levels by said two-level processing means and the assignment by said assigning means, maximum n−1 times under a predetermined condition.

2. A recording apparatus as claimed in claim 1, wherein said assigning means assigns each result to a different one of n−1 recording elements used for forming the dots composing the pixel.

3. A recording apparatus as claimed in claim 2, wherein the pixel is composed of the plurality of dots, and each of the plurality of dots is formed by a different recording element during respective scannings of said recording head.

4. A recording apparatus as claimed in claim 3, wherein each said recording element of said recording head includes an orifice for ejecting ink, and means for generating heat energy utilized for ejection of ink from said orifice, whereby a bubble is generated by the heat energy, the ink is ejected from said orifice according to the generation of the bubble, and the dots are formed by the ejected ink.

5. A recording apparatus as claimed in claim 3, wherein said assigning means sequentially assigns each result to one of said plurality of recording elements corresponding to the pixel.

6. A recording apparatus as claimed in claim 3, wherein said assigning means randomly assigns each result to one of said plurality of recording elements corresponding to the pixel.

7. A recording apparatus as claimed in claim 3, wherein said assigning means assigns each result to one of said plurality of recording elements corresponding to said pixel in accordance with a position of the pixel on the image.

8. A recording apparatus as claimed in claim 1, wherein said assigning means assigns each result to one recording element used for forming the dots composing the pixel.

9. A recording apparatus as claimed in claim 1, further comprising dividing means for dividing the pixel into n-i pseudo-pixels in correspondence with n-1 dots formed on said pixel and wherein said two-level processing means converts the input image data in correspondence with each of n-1 pseudo-pixels divided by said dividing means.

10. A recording apparatus as claimed in claim 9, wherein said n-level halftoning processing means distributes an error produced when the conversion by said two-level processing means is performed to other pseudo-pixels.

11. A recording apparatus as claimed in claim 10, wherein the pixel is composed of the plurality of dots, and each of the plurality of dots is formed by a different recording element during respective scannings of said recording head.

12. A recording apparatus as claimed in claim 11, wherein each of said recording elements of said recording head includes an orifice for ejecting ink, and means for generating heat energy utilized for ejection of ink from said orifice, whereby a bubble is generated by the heat energy, the ink is ejected from said orifice according to the generation of the bubble, and the dots are formed by the ejected ink.

13. A recording apparatus as claimed in claim 11, wherein said assigning means sequentially assigns each result to one of said plurality of recording elements corresponding to the pixel.

14. A recording apparatus as claimed in claim 11, wherein said assigning means randomly assigns each result to one of said plurality of recording elements corresponding to the pixel.

15. A recording apparatus as claimed in claim 11, wherein said assigning means assigns each result to one of said plurality of recording elements corresponding to the pixel in accordance with a position of the pixel on the image.

16. A recording apparatus as claimed in claim 1, wherein the dots forming the pixel are formed on a substantially same location on a recording medium.

17. A recording apparatus as in claim 1, wherein said assigning means assigns each result to one of said plurality of recording elements so that said driving data of each of the pixels are assigned to n-1 recording elements, respectively.

18. A recording apparatus as claimed in claim 1, wherein said threshold value is a value stored in a memory.

19. A recording apparatus as claimed in claim 1, wherein said threshold value is a value obtained as a mean density calculated based on the values of the pixels.

20. A method of forming driving data for a recording apparatus which uses a recording head having a plurality of recording elements and in which the recording elements are driven according to the driving data to form dots on a recording medium so that an image is recorded, said method comprising the steps of:
performing a two-level processing in which input image data is converted into data of two levels based on a threshold values assigning a result of the conversion performed by said two-level processing step as the driving data for a single pixel to a different one of the plurality of recording elements; and
repeating both of said two-level processing step and said assigning step, so that they are performed maximum n-1 times under a predetermined condition, where n-1=the maximum number of the driving data for forming the dots on a pixel, so that n-level halftoning processing is performed.

21. A method of forming driving data as claimed in claim 20, wherein said two-level processing is performed in correspondence with each of n-1 recording elements used for forming the dots composing the pixels.

22. A method of forming driving data as claimed in claim 21, wherein the pixel is composed of the plurality of dots, and each of the plurality of dots is formed by a different recording element during respective scannings of the recording head.

23. A method of forming driving data as claimed in claim 22, wherein each recording element of the recording head includes an orifice for ejecting ink, and means for generating heat energy utilized for ejection of ink from the orifice, whereby a bubble is generated by the heat energy, the ink is ejected from the orifice according to the generation of the bubble, and the dots are formed by the ejected ink.

24. A method of forming driving data as claimed in claim 22, wherein the recording elements to which the result of said two-level processing is assigned are sequentially selected.

25. A method of forming driving data as claimed in claim 22, wherein the recording elements to which the result of said two-level processing is assigned are selected at random.

26. A method of forming driving data as claimed in claim 22, wherein the recording elements to which the result of said two-level processing is assigned are selected according to a position of the pixel.

27. A method of forming driving data as claimed in claim 20, wherein said two-level processing is performed in correspondence with each of n-1 dots composing the pixels.

28. A method of forming driving data as claimed in claim 20, wherein said two-level processing is performed in correspondence with each of pseudo-pixels made by dividing the pixel into n-1 pixels.

29. A method of forming driving data as claimed in claim 28, wherein an error produced by said two-level processing is distributed to other pseudo-pixels.

30. A method of forming driving data as claimed in claim 29, wherein the pixel is composed of the plurality of dots, and each of the plurality of dots is formed by a different recording element during respective scannings of the recording head.

31. A method of forming driving data as claimed in claim 30, wherein each recording element of the recording head includes an orifice for ejecting ink, and means for generating heat energy utilized for ejection of ink from the orifice, whereby a bubble is generated by the heat energy, the ink is ejected from the orifice according to the generation of the bubble, and the dots are formed by the ejected ink.

32. A method of forming driving data as claimed in claim 30, wherein the recording elements to which the result of said two-level processing is assigned are sequentially selected.

33. A method of forming driving data as claimed in claim 30, wherein the recording elements to which the result of said two-level processing is assigned are selected at random.

34. A method of forming driving data as claimed in claim 30, wherein the recording elements to which the result of said two-level processing is assigned are selected according to a position of the pixel on the image.

35. A method of forming driving data as claimed in claim 20, wherein the dots forming the pixel are formed on a substantially same location on a recording medium.

36. A method as claimed in claim 20, wherein said threshold value is a value stored in a memory.

37. A method as claimed in claim 20, wherein said threshold value is a value obtained as a mean density calculated based on the values of the pixels.

* * * * *

UNITED STATES PATENT AND TRADEMARK OFFICE
CERTIFICATE OF CORRECTION

PATENT NO. : 6,120,121

DATED : September 19, 2000

INVENTOR(S) : Hideki Tanaka

It is certified that error appears in the above-identified patent and that said Letters Patent is hereby corrected as shown below:

COLUMN 1

Line 33, "responsive" should read --response--; and
Line 55, "I(x,y). Where" should read --I(x,y) where--.

COLUMN 2

Line 57, "ink-droplets" should read --ink-droplet's--; and
Line 64, "are" should read --is--.

COLUMN 6

Line 12, "of a" should read --of an--.

COLUMN 7

Line 15, "CPU on," should read --, for example, a microcomputer including a memory, and that the microcomputer would have a counter and a selector constructed either using hardware or software--;
Line 31, "read" should read --reads--;
Line 34, "responsive" should read --response--; and
Line 50, "a is" should read --a method is--.

COLUMN 8

Line 52, "presets" should read --preset--.

UNITED STATES PATENT AND TRADEMARK OFFICE
CERTIFICATE OF CORRECTION

PATENT NO. : 6,120,121

DATED : September 19, 2000

INVENTOR(S) : Hideki Tanaka

It is certified that error appears in the above-identified patent and that said Letters Patent is hereby corrected as shown below:

COLUMN 9

Line 3, "I'xy" should read --I'xy are--;
   Line 14, "I'xy" should read --I"xy--; and
   Line 37, "bit" should read --bits--.

COLUMN 12

Line 37, "one." should read --on.--;
   Line 42, "Numerals 202 to 298 each" should read --Each numeral 202 to 208--; and
   Line 44, "have" should read --has--.

COLUMN 13

Line 48, "errors" should read --error--;
   Line 59, "use" should read --used--;
   Line 65, "to" should read --to be--; and
   Line 67, delete "that".

COLUMN 14

Line 32, "are" should read --is--; and
   Line 67, "which" should read --on which--.

UNITED STATES PATENT AND TRADEMARK OFFICE
CERTIFICATE OF CORRECTION

PATENT NO. : 6,120,121

DATED : September 19, 2000

INVENTOR(S) : Hideki Tanaka

Page 3 of 4

It is certified that error appears in the above-identified patent and that said Letters Patent is hereby corrected as shown below:

COLUMN 15

Line 10, " "1" " should read --"1",--.

COLUMN 16

Line 1, "performed" should read --processed--; and
Line 67, "of which" should read --whose volume corresponds--.

COLUMN 17

Line 1, "volume corresponding" should be deleted; and
Line 54, "According, should read --Accordingly,--.

COLUMN 18

Line 5, "are" should read --is--.

UNITED STATES PATENT AND TRADEMARK OFFICE
CERTIFICATE OF CORRECTION

PATENT NO. : 6,120,121
DATED : September 19, 2000
INVENTOR(S) : Hideki Tanaka

It is certified that error appears in the above-identified patent and that said Letters Patent is hereby corrected as shown below:

COLUMN 20

Line 6, "an" should read --and an--.

COLUMN 23

Line 57, "values assigning" should read --value; ¶assigning--.

Signed and Sealed this

Twenty-ninth Day of May, 2001

NICHOLAS P. GODICI

Attest:

Attesting Officer

Acting Director of the United States Patent and Trademark Office